(12) United States Patent
Baba et al.

(10) Patent No.: US 9,457,512 B2
(45) Date of Patent: Oct. 4, 2016

(54) LITHIUM ION RECHARGEABLE BATTERY AND PROCESS FOR PRODUCING THE LITHIUM ION RECHARGEABLE BATTERY

(71) Applicant: NAMICS CORPORATION, Niigata-shi, Niigata (JP)

(72) Inventors: Mamoru Baba, Iwate (JP); Shoichi Iwaya, Niigata (JP); Hitoshi Masumura, Niigata (JP); Noriyuki Sakai, Niigata (JP); Takayuki Fujita, Niigata (JP); Hiroshi Sasagawa, Niigata (JP); Hiroshi Sato, Niigata (JP)

(73) Assignee: NAMICS CORPORATION, Niigata (JP)

( * ) Notice: Subject to any disclaimer, the term of this patent is extended or adjusted under 35 U.S.C. 154(b) by 280 days.

(21) Appl. No.: 13/932,375

(22) Filed: Jul. 1, 2013

(65) Prior Publication Data

US 2014/0015173 A1 Jan. 16, 2014

Related U.S. Application Data

(62) Division of application No. 12/599,941, filed as application No. PCT/JP2008/058616 on May 9, 2008, now abandoned.

(30) Foreign Application Priority Data

May 11, 2007 (JP) .................................. 2007-127443
May 11, 2007 (JP) .................................. 2007-127444

(51) Int. Cl.
B29C 65/02 (2006.01)
H01M 4/36 (2006.01)
(Continued)

(52) U.S. Cl.
CPC .............. *B29C 65/02* (2013.01); *H01M 4/366* (2013.01); *H01M 4/624* (2013.01);
(Continued)

(58) Field of Classification Search
None
See application file for complete search history.

(56) References Cited

U.S. PATENT DOCUMENTS 7,993,782 B2 8/2011 Takeda et al.
2002/0018939 A1 2/2002 Kugai
(Continued)

FOREIGN PATENT DOCUMENTS

JP H06-9141 B 2/1994
JP 2000-164252 6/2000
(Continued)

OTHER PUBLICATIONS

Taiwanese Office Action; Taiwanese Application No. 97117387, mailed Jun. 20, 2013.
(Continued)

*Primary Examiner* — Alix Eggerding
(74) *Attorney, Agent, or Firm* — Hamre, Schumann, Mueller & Larson, P.C.

(57) ABSTRACT

Conventional ion rechargeable batteries having an electrode layer on an electrolyte layer suffer from an impurity layer formed at the interface, degrading performance. Conventional batteries with no such impurity layer have a problem of weak interface bonding. In the present invention, in a baking process step after an electrode layer is laminated on an electrolyte layer, materials for an electrode layer and an electrolyte layer are selected such that an intermediate layer formed of a reaction product contributing to charging and discharging reactions is formed at the interface of the electrode layer and the electrolyte layer. In addition, a paste that an active material is mixed with a conductive material at a predetermined mixing ratio is used to form a positive electrode layer and a negative electrode layer. Reductions in electrode resistance and interface resistance and improvement of charging and discharging cycle characteristics are made possible.

10 Claims, 12 Drawing Sheets

(51) Int. Cl.
  *H01M 4/62* (2006.01)
  *H01M 10/0525* (2010.01)
  *H01M 10/0562* (2010.01)
  *H01M 4/485* (2010.01)
  *H01M 4/505* (2010.01)

(52) U.S. Cl.
  CPC ... *H01M 10/0525* (2013.01); *H01M 10/0562* (2013.01); *H01M 4/485* (2013.01); *H01M 4/505* (2013.01); *Y02E 60/122* (2013.01); *Y10T 29/49112* (2015.01)

(56) References Cited

U.S. PATENT DOCUMENTS

| | | | |
|---|---|---|---|
| 2003/0232248 A1* | 12/2003 | Iwamoto | H01M 4/66 429/233 |
| 2006/0014077 A1* | 1/2006 | Hatou et al. | 429/231.1 |
| 2006/0073388 A1* | 4/2006 | Harada et al. | 429/245 |
| 2006/0141361 A1* | 6/2006 | Yuasa | H01M 4/131 429/232 |
| 2007/0231700 A1 | 10/2007 | Watanabe | |
| 2007/0259271 A1 | 11/2007 | Nanno et al. | |

FOREIGN PATENT DOCUMENTS

| | | |
|---|---|---|
| JP | 2000-251938 | 9/2000 |
| JP | 2001-126758 | 5/2001 |
| JP | 2001-210360 | 8/2001 |
| JP | 2001-243984 | 9/2001 |
| JP | 2001-351615 | 12/2001 |
| JP | 2004-281316 | 10/2004 |
| JP | 2006-032129 | 2/2006 |
| JP | 2007-5279 | 1/2007 |
| JP | 2007-329107 | 12/2007 |
| TW | 200428691 | 12/2004 |
| WO | WO 2007/004590 | 1/2007 |

OTHER PUBLICATIONS

International Search Report, PCT/JP2008/058616, Jul. 29, 2008.
Kobayashi et al.,: "Densification of $LiTi_2(PO_4)_3$-based solid electrolytes by spark-plasma-sintering", Journal of Power Sources 81-82 (1999) pp. 853-858.
Hu et al.: "Ionic Conductivity of Lithium Ortho silicate—Lithium Phosphate Solid Solutions", J. Electrochem. Soc., 124, (1977), pp. 1240-1242.

* cited by examiner (a)

(b)

LITHIUM ION RECHARGEABLE BATTERY AND PROCESS FOR PRODUCING THE LITHIUM ION RECHARGEABLE BATTERY

This application is a division of U.S. Ser. No. 12/599,941, filed Dec. 30, 2009, which is a U.S. National Stage Application of PCT/JP2008/058616, filed May 9, 2008, which applications are incorporated herein by reference.

TECHNICAL FIELD

The present invention relates to a multilayer all solid state lithium ion rechargeable battery including a multilayered product formed of a positive electrode layer, an electrolyte layer, and a negative electrode layer, and a method of manufacture of the same.

BACKGROUND ART

Patent Document 1: JP 2007-5279 A
Patent Document 2: JP 2000-164252 A
Patent Document 3: JP 2004-281316 A
Patent Document 4: JP H06-9141 B
Patent Document 5: JP 2001-210360 A
Patent Document 6: JP 2001-351615 A
Non-Patent Document 1: J. Power Sources, 81-82, (1999), 853
Non-Patent Document 2: J. Electrochem. Soc., 124, (1977), 1240-1242

In recent years, the development of electronics techniques is remarkable, and portable electronic appliances are being reduced in size, weight, and thickness, and are provided with multiple functions. With these trends, batteries, which are power supplies of electronic appliances, are strongly demanded to reduce in size and weight and to improve reliability. In order to meet these demands, a multilayer lithium ion rechargeable battery was proposed, in which multiple positive electrode layers and negative electrode layers are laminated thorough an electrolyte layer. Because the multilayer lithium ion rechargeable battery is assembled by laminating a battery cell having a thickness of a few μm, reductions in size, weight, and thickness of the battery can be readily realized. The all solid state lithium ion rechargeable battery using a solid electrolyte instead of a liquid electrolyte is free from the leakage and exhaustion of the electrolyte, and highly reliable. Moreover, because the battery uses lithium, the battery can obtain high voltage and high energy density.

An all solid state lithium battery using an inorganic solid electrolyte for the electrolyte layer is prepared by in turn laminating the positive active material layer and the negative active material layer through the electrolyte layer to form a multilayered product. In this all solid state lithium battery, various problems have been reported in the past.

For example, in Non-Patent Document 1, it is reported that when $LiCoO_2$, which is a positive active material, and $LiTi_2(PO_4)_3$, which is a solid electrolyte, are laminated and baked, both react with each other in the baking process to produce an impurity layer formed of a compound such as $CoTiO_3$, $Co_2TiO_4$, or $LiCoPO_4$, which is not contribute to charging and discharging reactions, at the interface of the positive electrode layer and the electrolyte layer. This impurity layer is formed to cause a problem that energy loss is large, or the product does not function as a battery, because the interface resistance is high.

In Patent Document 1, a technique is disclosed in which specific materials are used for an active material and a solid electrolyte, whereby the above-described formation of the impurity layer is suppressed, an active material/solid electrolyte interface is formed, which is electrochemically active, and an all solid lithium ion rechargeable battery having a small internal resistance and high capacitance is provided. Preferably, the following materials are used as materials for the active material and the solid electrolyte:

positive active material: $LiMPO_4$
(where M is at least one kind selected from a group formed of Mn, Fe, Co, and Ni)
solid electrolyte: $Li_{1+x}M^{III}_xTi^{IV}_{2-x}(PO_4)_3$
(where $M^{III}$ is at least one kind selected from a group formed of Al, Y, Ga, In, and La, $0 \leq x \leq 0.6$)
negative active material: $FePO_4$, $Li_3Fe_2(PO_4)_3$, and $LiFeP_2O_7$.

Patent Document 1 describes that when a multilayered product having the positive active material layer, the electrolyte layer, and the negative active material layer formed of these materials laminated is analyzed by X-ray diffractometry, any components other than the components forming the active material layer and the electrolyte layer are not detected.

FIG. 12 is a cross section depicting a lithium ion rechargeable battery before described in Patent Document 1, showing an interface of a positive electrode layer and an electrolyte layer. The battery shown in FIG. 12 is produced according to a process described below. A positive active material powder formed of $LiCoPO_4$ and a solid electrolyte powder formed of $Li_{1.3}Al_{0.3}Ti_{1.7}(PO_4)_3$ are prepared, they are separately mixed with a binder, a solvent, and a plasticizer to form slurries to prepare green sheets. After the prepared positive active material green sheet and the solid electrolyte green sheet are laminated, the sheets are baked at a temperature of 900° C. to form a multilayered product formed of an electrolyte layer 103 and a positive electrode layer 102, and gold is sputtered onto the surface of the positive electrode layer 102 to form a metal layer 101.

In the lithium ion rechargeable battery produced according to Patent Document 1, no impurity layer interfering with the charging and discharging reactions of the battery is formed at the interface of the positive electrode layer 102 and the electrolyte layer 103. In addition, also at an interface of a negative electrode layer and an electrolyte layer, not shown, no impurity layer is formed. Moreover, including the impurity layers interfering with charging and discharging reactions, an area formed of a reaction product is not formed at the interface of the electrode layer and the electrolyte layer. On this account, the interface bonding between the electrode layer and the electrolyte layer is not strong, and it is incapable of providing a sufficiently large contact area at the interface of the electrode layer and the electrolyte layer. Therefore, there is a problem that excellent charging and discharging cycle characteristics cannot be obtained because of the occurrence of delamination caused by long time use of the battery to increase internal resistance.

DISCLOSURE OF THE PRESENT INVENTION

Problems that the Present Invention is to Solve

It is an object of the present invention to provide a multilayer all solid state lithium ion rechargeable battery having a positive electrode layer, an electrolyte layer, and a negative electrode layer laminated on each other, the lithium ion rechargeable battery capable of reducing the internal resistance and improving charging and discharging cycle characteristics of the battery by strengthening the interface bonding of a multilayered product and reducing electrode resistance and interface resistance at the same time, and a method of manufacture of the same.

Means for Solving the Problems

An invention (1) is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein an intermediate layer formed of a substance that functions as an active material or an electrolyte is included at an interface of the positive electrode layer and/or the negative electrode layer and the electrolyte layer and the intermediate layer is a layer formed from a reaction and/or diffusion between the positive active material and/or the negative active material and the solid electrolyte.

An invention (2) is the lithium ion rechargeable battery according to the invention (1), characterized in that the positive electrode layer and/or the negative electrode layer has a structure in which an active material is supported in a conductive matrix formed of a conductive material.

An invention (3) is the lithium ion rechargeable battery according to the invention (2), characterized in that an area ratio between the positive active material and/or the negative active material and the conductive material in a cross section of the positive electrode layer and/or the negative electrode layer is within a range of 20:80 to 65:35.

An invention (4) is the lithium ion rechargeable battery according to any one of the inventions (1) to (3), characterized in that the intermediate layer is a layer formed from a reaction between the positive active material and/or the negative active material and the solid electrolyte.

An invention (5) is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the positive electrode layer is formed of a sintered compact produced from a reaction and/or diffusion between a starting material for the positive active material contained in the positive electrode layer before baked and a starting material for the solid electrolyte contained in the electrolyte layer before baked.

An invention (6) is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the negative electrode layer is formed of a sintered compact produced from a reaction and/or diffusion between a starting material for the positive active material contained in the positive electrode layer before baked and a starting material for the solid electrolyte contained in the electrolyte layer before baked.

An invention (7) is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the electrolyte layer is formed of a sintered compact produced from a reaction and/or diffusion between a starting material for the positive active material contained in the positive electrode layer before baked and a starting material for the solid electrolyte contained in the electrolyte layer before baked, and/or formed of a sintered compact produced from a reaction and/or diffusion between a starting material for the negative active material contained in the negative electrode layer before baked and a starting material for the solid electrolyte contained in the electrolyte layer before baked.

An invention (8) is the lithium ion rechargeable battery according to any one of the inventions (5) to (7), characterized in that the positive electrode layer and/or the negative electrode layer has a structure in which an active material is supported in a conductive matrix formed of a conductive material.

An invention (9) is the lithium ion rechargeable battery according to the invention (8), characterized in that an area ratio between the positive active material and/or the negative active material and the conductive material in a cross section of the positive electrode layer and/or the negative electrode layer is within a range of 20:80 to 65:35.

An invention (10) is the lithium ion rechargeable battery according to any one of the inventions (1) to (9), characterized in that the positive electrode layer, the negative electrode layer, and/or the electrolyte layer is formed of a substance that functions as an active material or an electrolyte formed from a reaction between a starting material for the positive active material and/or a starting material for the negative active material and a starting material for the solid electrolyte.

An invention (11) is the lithium ion rechargeable battery according to any one of the inventions (1) to (10), characterized in that an oxide containing no lithium is not included in a substance forming the intermediate layer or the sintered compact.

An invention (12) is the lithium ion rechargeable battery according to any one of the inventions (1) to (11), characterized in that a starting material for the solid electrolyte contains at least a complex oxide of lithium and a IV group element.

An invention (13) is the lithium ion rechargeable battery according to any one of the inventions (1) to (12), characterized in that a starting material for the solid electrolyte contains at least a lithium silicate.

An invention (14) is the lithium ion rechargeable battery according to any one of the inventions (1) to (13), characterized in that a starting material for the solid electrolyte contains at least a lithium silicate and a lithium phosphate.

An invention (15) is the lithium ion rechargeable battery according to the invention (14), characterized in that a mixing ratio between the lithium silicate and the lithium phosphate is within a range of 4:6 to 6:4.

An invention (16) is the lithium ion rechargeable battery according to any one of the inventions (1) to (15), characterized in that the thickness of the electrolyte layer is 30 µm or below.

An invention (17) is the lithium ion rechargeable battery according to any one of the inventions (1) to (16), characterized in that a starting material for the positive active material or the negative active material contains a substance or a plurality of substances selected from a substance group of a lithium manganese oxide, lithium nickel oxide, lithium cobalt oxide, lithium vanadium oxide, lithium titanium oxide, manganese dioxide, titanium oxide, niobium oxide, vanadium oxide, and tungsten oxide.

An invention (18) is the lithium ion rechargeable battery according to the invention (17), characterized in that a starting material for the positive active material contains a lithium manganese oxide.

An invention (19) is the lithium ion rechargeable battery according to the invention (18), characterized in that a starting material for the positive active material contains $Li_xMn_yO_z$ (where x=1 to 2, y=1 to 2, and z=2 to 4).

An invention (20) is the lithium ion rechargeable battery according to the invention (17), characterized in that a starting material for the negative active material contains a lithium titanium oxide.

An invention (21) is the lithium ion rechargeable battery according to the invention (20), characterized in that a starting material for the positive active material contains $Li_xTi_yO_z$ (where x=1 to 2, y=1 to 5/3, and z=2 to 4).

An invention (22) is a method of manufacture of a lithium ion rechargeable battery characterized by including the steps of: alternately laminating a positive electrode layer green sheet and a negative electrode layer green sheet through at least an electrolyte layer green sheet to form a multilayered product; and collectively baking the multilayered product to form a sintered multilayered product, wherein a starting material for the electrolyte layer contains at least a complex oxide of lithium and a IV group element.

An invention (23) is a method of manufacture of a lithium ion rechargeable battery characterized by including the steps of: dispersing at least a solid electrolyte material in a binder and a solvent to form a solid electrolyte layer paste; coating and drying the solid electrolyte layer paste to form a solid electrolyte layer green sheet; mixing an active material with a conductive material, and dispersing the materials in a binder and a solvent to form a positive electrode layer paste and/or a negative electrode layer paste; coating and drying the positive electrode layer paste and/or the negative electrode layer paste to form a positive electrode layer green sheet and/or a negative electrode layer green sheet; alternately laminating the positive electrode layer green sheet and the negative electrode layer green sheet through the solid electrolyte layer green sheet to form a multilayered product; and collectively baking the multilayered product to form a sintered multilayered product, wherein a starting material for the electrolyte layer contains at least a complex oxide of lithium and a IV group element.

An invention (24) is the method of manufacture of a lithium ion rechargeable battery according to the invention (23), characterized in that a mixing ratio of mixing the active material with the conductive material is within a range of 20:80 to 65:35 in a volume ratio.

An invention (25) is the method of manufacture of a lithium ion rechargeable battery according to any one of the inventions (22) to (24), characterized in that a baking temperature in the baking step ranges from temperatures of 600° C. or greater to 1100° C. or below.

An invention (26) is the method of manufacture of a lithium ion rechargeable battery according to any one of the inventions (22) to (24), characterized in that a baking temperature in the baking step ranges from temperatures of 800° C. or greater to 1050° C. or below.

Advantage of the Present Invention

According to the present invention (1), or (5) to (7), or (10), and (22), the interface bonding of the multilayered product of the lithium ion rechargeable battery is strengthened, and the interface resistance is reduced at the same time, whereby battery internal resistance can be reduced, and charging and discharging cycle characteristics can be improved.

According to the invention (2), (3), (8), (9), (23), or (24), the following advantages are exerted.

1. The mixing ratio between the active material and the conductive material is within a range of 20:80 to 65:35 in the area ratio, whereby the electrode structure is the structure in which the active material is supported in the conductive matrix, and the conductive matrix assists the active material of a low electric conductivity to carry current. Thus, the present invention is advantageous in improving battery performance such as a reduction in impedance and an increase in ampere-hour capacity.

2. Because the electrode layer functions as the active material layer and the current collector layer before in a single layer, no current collector layer is necessary, and the present invention is advantageous in a simplified process steps, reductions in manufacture costs, prevention of sheet attack, and the like.

3. The electrode is formed in the structure in which the active material is supported in the conductive matrix, whereby the active material and the conductive material are entangled with each other. Thus, expansion caused by charging and discharging and the removal of the active material and the conductive material because of contraction can be suppressed, and the present invention is advantageous in improving charging and discharging cycle characteristics.

4. The active material, which is difficult to be adopted in the past because of its too small electric conductivity, is supported in the conductive matrix, whereby the active material can be adopted as an excellent active material for the electrode material of the lithium ion rechargeable battery.

According to the inventions (11) to (13), at the interface of the electrode layer and the electrolyte layer, the formation of a useful reaction product that functions as the active material or the electrolyte can be promoted.

According to the invention (14), the ionic conductance in the electrolyte layer can be improved.

According to the invention (15), the ionic conductance in the electrolyte layer can be made optimum.

According to the invention (16), a small-sized lithium ion rechargeable battery of large capacity with low internal resistance and high performance can be produced.

According to the inventions (17) to (21), a useful intermediate layer contributing to the charging and discharging reactions of the battery can be formed at the interface of the electrode layer and the electrolyte layer.

According to the invention (25), a useful intermediate layer can be formed, and problems such as the melting of the solid electrolyte, structural changes in the positive active material and the negative active material, and the deformation of the multilayered product can be prevented.

According to the invention (26), the present invention is effective for compacting the electrode layer and the electrolyte layer and a reduction in battery internal resistance.

DESCRIPTION OF REFERENCE NUMERALS AND SIGNS

Figure 1:
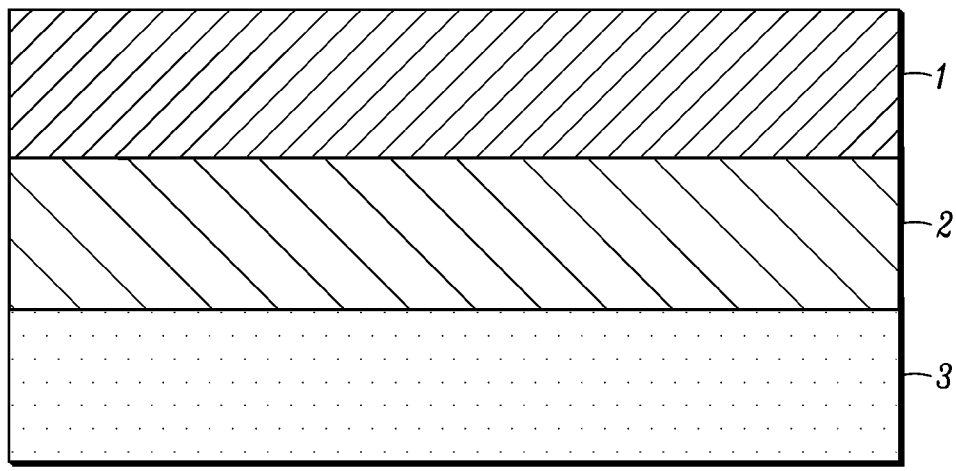
FIGS. 1(a) and 1(b) are cross sections depicting a lithium ion rechargeable battery according to according to a specific embodiment of the present invention before baked and after baked.
Figure 1:
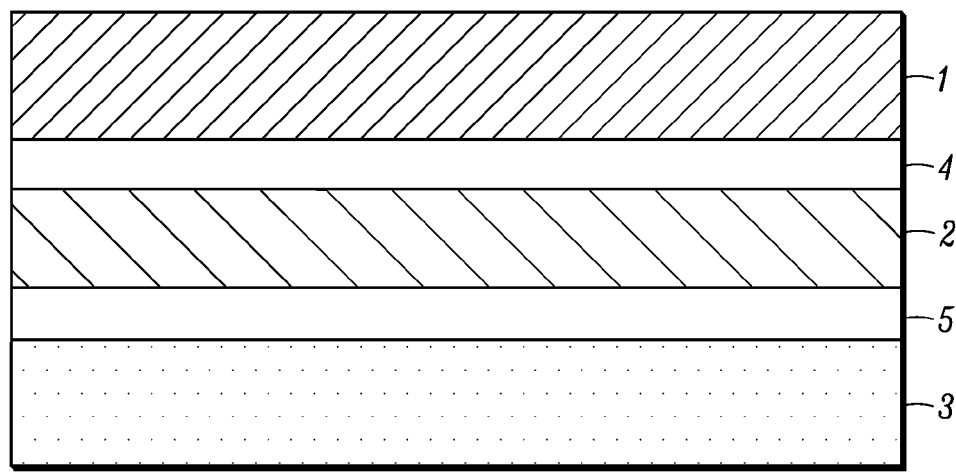

1: positive electrode layer
2: electrolyte layer
3: negative electrode layer
4: intermediate layer formed at a positive electrode layer/ electrolyte layer interface
5: intermediate layer formed at a negative electrode layer/ electrolyte layer interface
6, 9: electrolyte layer
7, 10: intermediate layer
8, 11: negative electrode layer
21: positive electrode layer
22: electrolyte layer
23: negative electrode layer
24: intermediate layer formed at a positive electrode layer/ electrolyte layer interface
25: intermediate layer formed at a negative electrode layer/ electrolyte layer interface
26: positive active material concentration
27: electrolyte the concentration
28: negative active material concentration
29, 32: reaction product layer that functions as a positive electrode
30, 34: reaction product layer that functions as a negative electrode
31, 33: reaction product layer that functions as an electrolyte
101: metal layer
102: positive electrode layer
103: electrolyte layer

BEST MODE FOR CARRYING OUT THE PRESENT INVENTION

Hereinafter, the best mode of the present invention will be described. A lithium ion rechargeable battery according to the present invention is a lithium ion rechargeable battery formed of a multilayered product having a positive electrode layer and a negative electrode layer alternately laminated through an electrolyte layer in which an intermediate layer formed from reactions by baking the multilayered product is provided at an interface of the electrolyte layer and any one of the positive electrode layer and the negative electrode layer, or both at an interface of the positive electrode layer and the electrolyte layer and an interface of the negative electrode layer and the electrolyte layer. Moreover, a material for the electrolyte layer is properly selected to allow the intermediate layer to function as an active material or an electrolyte.

The present inventors used a plurality of active materials and a plurality of solid electrolyte materials to produce lithium ion rechargeable batteries, and compared and studied the batteries. As the result, they found that when a starting material containing a complex oxide of lithium and a IV group element such as a lithium silicate and a lithium germanium oxide is used, no impurity layer is formed at the interface of the electrode layer and the electrolyte layer (hereinafter, a layer formed of a reaction product that does not function as either an active material or an electrolyte is referred to as "an impurity layer") in the baking process, and the active material and the solid electrolyte react with each other to produce a layer formed of a useful reaction product contributing to charging and discharging reactions (hereinafter, such a layer formed of a useful reaction product that functions as an active material or an electrolyte is referred to as "an intermediate layer"). Methods of preparing individual layers of the positive electrode layer, the electrolyte layer, and the negative electrode layer were conducted in which powders for the individual layers were each dispersed in a solvent and a binder to form pastes, each of the pastes was coated and dried on a sheet to form a green sheet, and the sheets were laminated and then baked. It was found that substances forming the intermediate layer do not include an oxide containing no lithium and only substances that function as the active material or the electrolyte in the lithium ion rechargeable battery are produced.

In addition, it was found that when only a phosphoric acid material such as a lithium phosphate widely used is used for a solid electrolyte of a lithium ion rechargeable battery, no reaction product is produced at the interface. It can be considered that this is because a phosphate such as a lithium phosphate is a single salt and it is hard to react with the active material. In contrast to this, it is estimated that lithium silicate $Li_4SiO_4$, for example, is a complex oxide of $Li_2O$ and $SiO_2$, and highly reactive $Li_2O$, isolated by baking, reacts with the active material.

Moreover, the present inventors found that a material having an active material mixed with a conductive material is used for the material forming the positive electrode layer and/or the negative electrode layer, whereby the impedance of the electrode can be reduced. In addition, they found that the mixing ratio between an active material and a conductive material forming the electrode is changed to produce and evaluate batteries, and as the result, when both of the mixing ratio between a positive active material and a conductive material, which are materials for a paste, and the mixing ratio between a negative active material and a conductive material range from 20:80 to 65:35, such batteries having excellent characteristics of high electric conductivity and large ampere-hour capacity can be produced. It was found from the results of observing the cross sections of batteries produced under the optimum conditions by SEM and EDS that the area ratio between the active material and the conductive material in the electrode cross section ranges from 20:80 to 65:35 as similar to the volume ratio. In addition, it was found that when the mixing ratio of the conductive material is 35% or greater in the volume ratio, the conductive material continues in a matrix in the cross section and the active material is supported in the matrix-like conductive material. It was also found that in order to form such a matrix structure, it is necessary to bake a multilayered product at a high temperature of 600° C. or greater.

Here, in the present application, the term "conductive matrix", or "matrix-like conductive material" means a structure that conductive material particles three-dimensionally continue and contact with one another. When the conductive material is a metal, the term "metal matrix" is sometimes used. In addition, the expression "a structure that an active material is supported in a conductive matrix" means a structure that active material particles are distributed among conductive material particles, which are three-dimensionally continue and contact with one another. The active material particles may be continuously distributed, or may be discontinuously distributed. However, preferably, the active material particles are uniformly distributed in the electrode. In addition, the expression "to be three-dimensionally continuous" means that even though a partially discontinuing portion exists on a two-dimensional cross section, it is considered to be three-dimensionally continuous when a continuing area exists at least in the other cross sections.

In addition, even though a slight amount of an additive is added as an electrode material in addition to an active material and a conductive material, the mixing ratio between the active material and the conductive material to be a paste material is set in the range of 20:80 to 65:35 to form the electrode structure into a conductive matrix in which an active material is supported, and excellent batteries having a low impedance and a large ampere-hour capacity can be produced, as long as the amount of the additional additive does not greatly reduce an amount of the active material or the conductive material.

The lithium ion rechargeable battery according to the present invention is highly advantageous in producing batteries of high performance even though the positive electrode layer and/or the negative electrode layer is unnecessarily formed in the structure in which an active material is supported in a conductive matrix as long as a useful reaction layer is formed from a reaction between the positive electrode layer and/or the negative electrode layer and the solid electrolyte layer. In addition, the positive electrode layer and/or the negative electrode layer are formed in the structure in which an active material is supported in a conductive matrix, whereby batteries of higher performance can be prepared.

[Structure of a Battery]

FIGS. 1(a) and 1(b) are cross sections depicting a lithium ion rechargeable battery according to a specific embodiment of the present invention before baked and after baked. In addition, FIGS. 1(a) and 1(b) are cross sections depicting a secondary battery having the most basic structure of a multilayered product. The multilayered product has a structure in which a positive electrode layer 1 is laminated on a negative electrode layer 3 through an electrolyte layer 2.

For a positive active material forming the positive electrode layer 1, $LiMn_2O_4$, for example, is used. For a solid electrolyte forming the electrolyte layer 2, $Li_{3.5}Si_{0.5}P_{0.5}O_4$, for example, is used. For a negative active material forming the negative electrode layer 3, $Li_{4/3}Ti_{5/3}O_4$, for example, is used.

Although $Li_{3.5}Si_{0.5}P_{0.5}O_4$ used for the solid electrolyte is a solid solution of $Li_3PO_4$ and $Li_4SiO_4$, it was found from experimental results that $Li_4SiO_4$ greatly contributes to reactions with the active material in $Li_3PO_4$ and $Li_4SiO_4$ forming the electrolyte. When the multilayered product shown in FIG. 1(a) is baked at a temperature of 600° C. or greater, as shown in FIG. 1(b), an intermediate layer 4 is formed at the interface of the positive electrode layer 1 and the electrolyte layer 2, and an intermediate layer 5 is formed at the interface of the negative electrode layer 3 and the electrolyte layer 2. The intermediate layer 4 contains substances such as $LiMnO_2$, $Li_2MnO_3$, and $Li_{1.4}Mn_{1.7}O_4$. $LiMnO_2$ and $Li_{1.4}Mn_{1.7}O_4$ function as active materials, and $Li_2MnO_3$ functions as an electrolyte. The intermediate layer 5 contains substances such as $LiTiO_2$ and $Li_2TiO_3$. $LiTiO_2$ functions as an active material, and $Li_2TiO_3$ functions as an electrolyte.

For example, it is considered that the formation of the intermediate layer at the negative electrode side interface occurs by the reactions below.

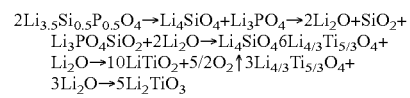

Moreover, it was found that as the baking temperature is increased, the reaction product at the positive electrode side interface changes from $LiMn_2O_4$ to more Li-rich compounds, $Li_{1.4}Mn_{1.7}O_4$, $Li_{1.6}Mn_{1.6}O_4$, $LiMnO_2$, and $Li_2MnO_3$, and the reaction product at the negative electrode side interface changes from $Li_{4/3}Ti_{5/3}O_4$ to more Li-rich compounds, $LiTiO_2$ and $Li_2TiO_3$.

Figure 2:
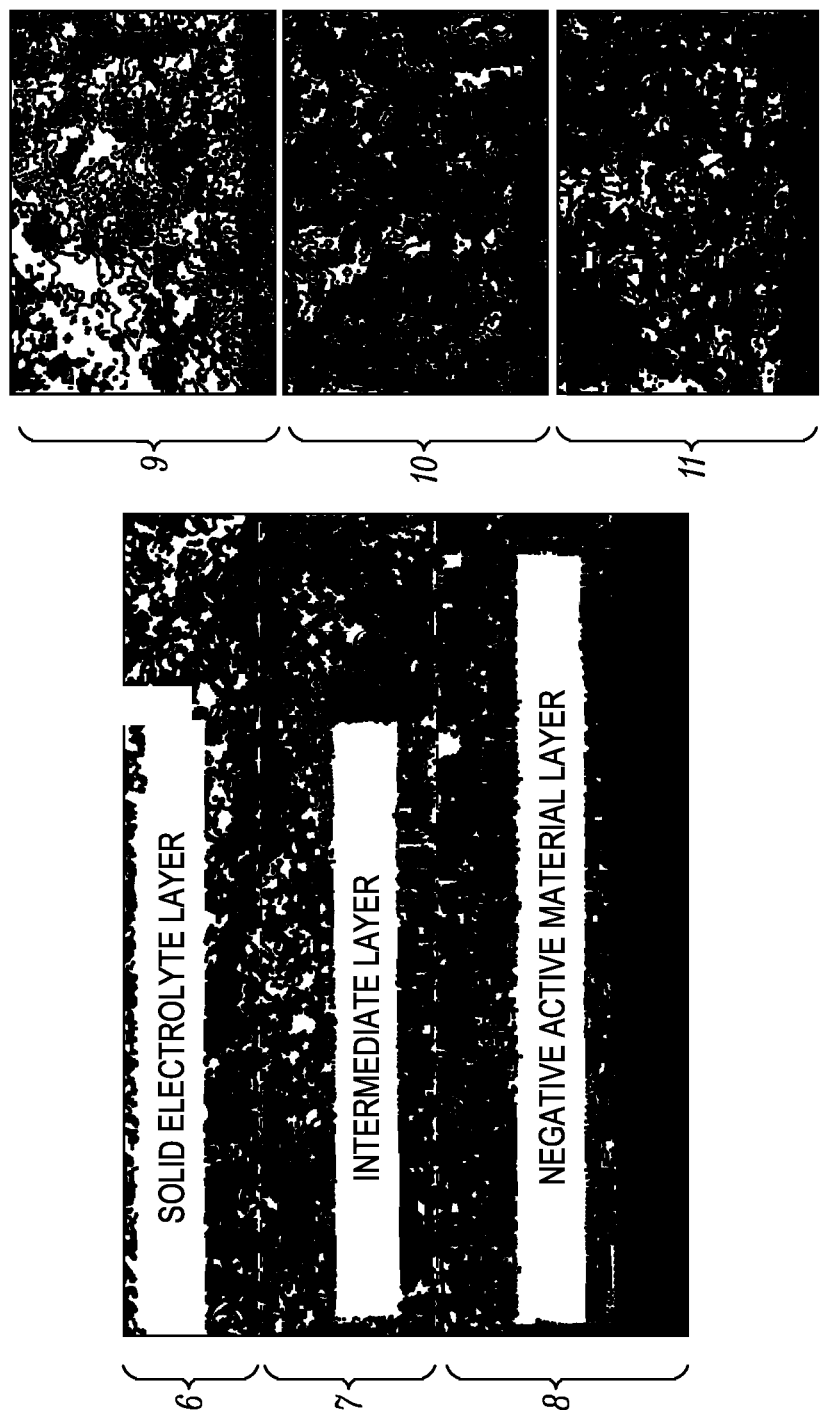
FIG. 2 shows cross sectional SEM photographs of a lithium ion rechargeable battery.

FIG. 2 shows cross sectional SEM photographs of a lithium ion rechargeable battery. The photographs shown in FIG. 2 show the interface of the negative electrode layer and the electrolyte layer of the battery shown in FIG. 1(a), and the battery was produced in which the temperature was increased to a temperature of 870° C. at a rate of temperature rise of 200° C./hr, and then the battery was held for two hours and allowed to stand to cool. It is seen from the photograph shown in the left that an intermediate layer 7 is formed between an electrolyte layer 6 and a negative electrode layer 8. It is seen from the photograph that the thickness of the intermediate layer is about 10 μm. The photograph shown on the right is a photograph that partially enlarges the areas of the individual layers in the photograph shown in the left, showing an electrolyte layer 9, an intermediate layer 10, and a negative electrode layer 11. It is seen that the intermediate layer 10 exists, which is clearly different from the electrolyte layer 9 and the negative electrode layer 11, the electrolyte layer 6 is strongly bonded to the intermediate layer 7, and the intermediate layer 7 is strongly bonded to the negative electrode layer 8. In a cross sectional photograph of a battery using materials to form no intermediate layers, such strong bonding is not conformed. It was found from the analysis results that substances forming the intermediate layer include substances such as $LiTiO_2$ and $Li_2TiO_3$ as described above. It is known that $LiTiO_2$ functions as an active material, and $Li_2TiO_3$ functions as an electrolyte.

Similar SEM observations were made to the interface of the electrolyte layer and the negative electrode layer as well as to the interface of the electrolyte layer and the positive electrode layer, and it was found that an intermediate layer existed. The positive electrode layer was strongly bonded to the electrode layer through the intermediate layer also at the positive electrode side interface. In addition, it was found from the analysis results that the positive electrode side intermediate layer contained substances such as $LiMnO_2$, $Li_2MnO_3$, and $Li_{1.4}Mn_{1.7}O_4$ as described above. It is known that $LiMnO_2$ and $Li_{1.4}Mn_{1.7}O_4$ functions as active materials, and $Li_2MnO_3$ functions as an electrolyte.

In addition, it was confirmed from the analysis results that the intermediate layer had no impurities that do no function as either an active material or an electrolyte. Because the intermediate layer formed in the baking process strengthened bonding between the positive electrode layer, the negative electrode layer and the electrolyte layer and the contact area between the active material and the electrolyte was dramatically increased in the intermediate layer at the same time, a substantial reduction in interface resistance was implemented. Because the bonding strength of the interface was strong even though charging and discharging are repeated for a long time, the intermediate layer was also advantageous in improving charging and discharging cycle characteristics.

When the thicknesses of the layers forming the battery become thinner, the battery internal resistance is more affected from the ion conductance at the interface of the electrode layer and the electrolyte layer than the electronic conductivity in the electrode layer and the ionic conductance in the electrolyte layer. The development of the lithium ion rechargeable battery is being advanced for further reductions in size and provisions of larger capacity and high output voltage, and the thicknesses of the electrode layer and the electrolyte layer tend to be much thinner. Because the technique according to the present invention can substantially decrease interface resistance, significant advantages can be particularly obtained when the technique is adapted to a battery having a thickness of its electrolyte layer being 30 µm or below.

In the battery according to the specific embodiment shown in FIGS. 1(a) and 1(b), a battery formed of a single battery cell is shown in which a single positive electrode layer is laminated on a single negative electrode layer as a single electrolyte layer is sandwiched between these layers. However, batteries are generally produced as a large number of battery cells are laminated on each other. In other words, a battery has a multilayered product in which a plurality of positive electrode layers and a plurality of negative electrode layers are alternately laminated through an electrolyte layer. It is without saying that the technique according to the present invention is also applicable to such batteries and exerts excellent advantages. When the number of the battery cells is increased and the number of the interfaces is grown, the advantages of the present invention are more significantly exerted. In order to fully enjoy the merits of the technique according to the present invention, preferably, the number of battery cells ranges from 2 to 500 cells, and more preferably, 5 to 500 cells. In addition, the structure of the lithium ion rechargeable battery according to the present invention may be a structure in which a current collector layer is not laminated on the electrode layer, or may be a structure in which a current collector layer is laminated on the electrode layer.

[Materials of the Battery]

(Materials for the Active Material)

For the active material forming the electrode layer of the lithium ion rechargeable battery according to the present invention, preferably, materials that efficiently release and attract lithium ions are used. For example, preferably, transition metal oxides and transition metal complex oxides are used. More specifically, preferably, lithium manganese complex oxides, lithium nickel complex oxides, lithium cobalt complex oxides, lithium vanadium complex oxides, lithium titanium complex oxides, manganese dioxides, titanium oxides, niobium oxides, vanadium oxides, tungsten oxides, and the like are used. Moreover, because lithium manganese complex oxides and lithium titanium complex oxides particularly have small changes in the volume caused by the attraction and release of lithium ions and hardly cause fine powders and removal of electrodes, these oxides can be more preferably used for the active material.

Here, there is no clear distinction between the positive active material and the negative active material. The potentials of two kinds of compounds are compared, the compound showing higher potential can be used for the positive active material, and the compound showing lower potential can be used for the negative active material. For the positive active material, lithium manganese oxides are particularly preferably used. For the negative active material, lithium titanium oxides are particularly preferably used.

In addition, for supplementary explanations, the term "complex oxide" means an oxide containing two kinds of elements or greater in addition to oxygen, and the term "lithium manganese oxide", for example, is referred to as "lithium manganese complex oxide". Oxides containing only a single element in addition to oxygen are simply referred to as "oxides". However, the term "oxide" means a higher-level concept including the term "complex oxide". Therefore, the term "lithium manganese complex oxide" means the same substance as "lithium manganese oxide".

(Materials for the Conductive Material)

The structure of the lithium ion rechargeable battery according to the present invention may be a structure in which a current collector layer formed of a conductive material is laminated on an electrode layer. In addition, the positive electrode layer and/or the negative electrode layer may be formed in a structure in which an active material is supported in a conductive matrix formed of a conductive material. For such conductive materials, preferably, a material having a large electric conductivity is used. For example, preferably, a metal or an alloy of high oxidation resistance is used.

Here, a metal or an alloy of high oxidation resistance is a metal or an alloy having an electric conductivity of $1 \times 10^1$ S/cm or greater after baked under atmosphere. More specifically, for the metal, silver, palladium, gold, platinum, aluminum, or the like is preferably used. For the alloy, an alloy formed of two kinds of metals or greater selected from silver, palladium, gold, platinum, copper, and aluminum is preferably used. For example, AgPd is preferably used. For AgPd, a powder mixture of Ag powder and Pd powder or AgPd alloy powder is preferably used.

A conductive material that is mixed with an active material for preparing an electrode layer may be the same in the positive electrode and the negative electrode, or may be different. In other words, preferably, the material, mixing ratio, and manufacture conditions of the conductive material are suitably individually selected for the positive electrode and the negative electrode.

(Materials for the Solid Electrolyte)

Figure 6:
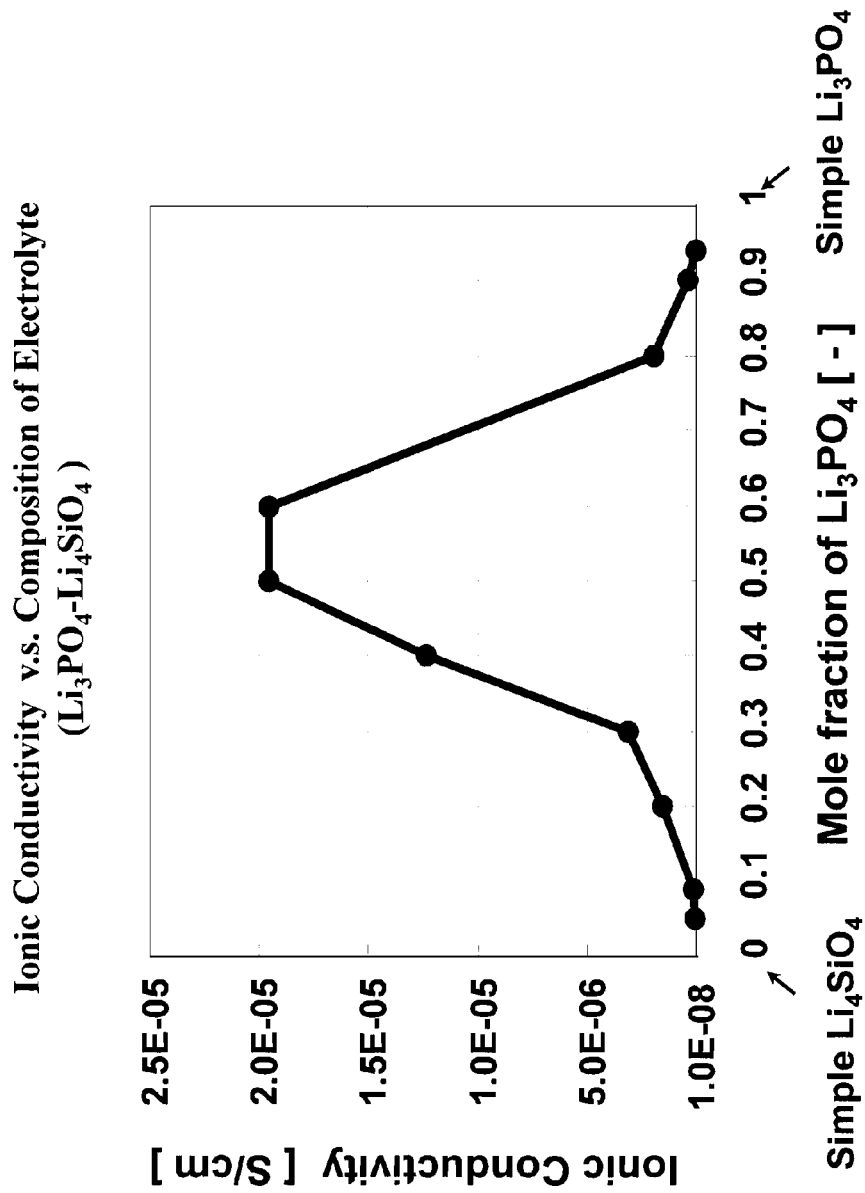
FIG. 6 is a graph depicting the dependency of ionic conductivity of lithium silicophosphate on electrolyte material compositions.

For the solid electrolyte forming the electrolyte layer of the lithium ion rechargeable battery according to the present invention, materials having a small electronic conductivity and a high lithium ion conductance are preferably used. In addition, preferably, materials are inorganic materials that can be baked in atmosphere. In addition, preferably, a complex oxide of lithium and a IV group element such as a lithium silicate is used for forming a reaction product contributing to charging and discharging. For example, preferably, at least one kind of material selected from a group formed of lithium silicophosphate ($Li_{3.5}Si_{0.5}P_{0.5}O_4$), phosphoric acid germanium lithium $Li_{3.5}Ge_{0.5}P_{0.5}O_4$, $Li_2O$—$SiO_2$, $Li_2O$—$V_2O_5$—$SiO_2$, and $Li_2O$—$GeO_2$ is used. Particularly, preferably, a lithium silicophosphate is used. A lithium silicophosphate is a complex oxide of a lithium phosphate and a lithium silicate, which is sometimes expressed by $Li_3PO_4$—$Li_4SiO_4$. A lithium silicate having effect on generating a substance useful for charging and discharging reactions is mixed with a lithium phosphate having high ionic conductivity, whereby the ionic conductivity of the electrolyte layer is advantageously improved. FIG. 6 is a graph depicting the dependency of the ionic conductivity of lithium silicophosphate on the composition (mixing ratio) of $Li_3PO_4$ and $Li_4SiO_4$, plotted based on data described in Non-Patent Document 2. It is seen that the ionic conductivity becomes the highest when the mixing ratio between $Li_3PO_4$ and $Li_4SiO_4$ is in the range of 4:6 to 6:4 in a mol ratio.

For the solid electrolyte material, such materials may be used that these materials are doped with different kinds of elements, $Li_3PO_4$, $LiPO_3$, $Li_4SiO_4$, $Li_2SiO_3$, $LiBO_2$, or the like. In addition, the material for the electrolyte layer may be any of crystalline substances, amorphous substances, and vitreous substances.

[Method of Manufacture of the Battery]

The multilayered product configuring the multilayer all solid state lithium ion rechargeable battery according to the present invention is fabricated in which materials for the positive electrode layer, the electrolyte layer, and the negative electrode layer forming the multilayered product and a given protective layer are individually formed into pastes, the pastes are coated and dried to prepare green sheets, these green sheets are laminated on each other, and a prepared multilayered product is collectively compressed for baking.

Here, for the materials individually used to form the pastes of the positive active material, the negative active material, and the solid electrolyte, calcined inorganic salts and the like, which are raw materials for these materials, can be used. For the materials for the solid electrolyte, preferably, materials containing a complex oxide of a IV group element and lithium such as a lithium silicate are used. From the viewpoint that calcination advances the chemical reactions between the raw materials to sufficiently exert their functions after the multilayered product is collectively baked, preferably, the calcination temperatures of all of the positive active material, the negative active material, and the solid electrolyte are temperatures of 600° C. or greater.

Although pasting methods are not restricted particularly, for example, a powder of each material is mixed with an organic solvent and a binder carrier to obtain a paste. For example, $LiMn_2O_4$ powder, the positive active material, is dispersed into a solvent and a carrier to prepare a positive electrode paste. By the similar methods, an electrolyte layer paste and a negative electrode paste are prepared.

In addition, for example, when an electrode formed of a material having an active material mixed with a conductive material, a powder of each of the materials is mixed with an organic solvent and a binder carrier to obtain a paste. For example, $LiMn_2O_4$ powder, the positive active material, is mixed with a mixture of a metal powder of Ag and Pd, the conductive material, at a predetermined volume ratio, and the resulting mixture is dispersed into a solvent and a carrier to prepare a positive electrode paste.

Preferably, the particle diameters (particle size) of the active material powder and the conductive material powder are 3 μm or below for any of the positive active material, the negative active material, and the conductive material. In addition, for the particle size ratio between the active material powder and the conductive material powder, preferably, the ratio between the active material and the conductive material is in the range of 1:50 to 50:1 for both of the positive active material and the negative active material. Because a conductive matrix is properly formed in the electrode by baking and the active material is properly supported in the matrix as long as the particle size and the particle size ratio are in the above-described ranges, it is effective to improve battery performance such as a reduction in impedance and an increase in ampere-hour capacity. Preferably, the volume ratio of mixing the active material powder with the conductive material powder ranges from 20:80 to 65:35. When AgPd is used for the conductive material, in addition to a metal powder mixture of Ag and Pd, a composite powder prepared by Ag—Pd coprecipitation process, or Ag—Pd alloy powder can be used. By this method, the positive electrode layer paste, the solid electrolyte layer paste, and the negative electrode paste are prepared.

The prepared pastes are coated on a base material such as PET in desired order and dried as necessary, and then the base material is removed to prepare a green sheet. Paste coating methods are not limited particularly, and publicly known methods such as screen printing, coating, transfer, and doctor blading can be adopted.

The prepared green sheets for the positive electrode layer the electrolyte layer, and the negative electrode layer are laminated on each other in desired order and the desired number of layers, aligned as necessary, and cut to prepare a multilayered product.

The prepared multilayered product is collectively compressed. Although the prepared multilayered product is compressed while heated, the heating temperature is at temperatures of 40 to 70° C., for example. The compressed multilayered product is heated and baked under atmosphere, for example. Here, the term "baking" referred to as heat treatment for the purpose of sintering. The term "sintering" is referred to as a phenomenon that when a solid powder aggregate is heated at a temperature lower than the melting point, the solid powder aggregate is compacted to be a dense product called a sintered compact.

In manufacture of the lithium ion rechargeable battery according to the present invention, preferably, the baking temperature ranges from temperatures of 600 to 1100° C. This is because such problems arise that when the temperature is below a temperature of 600° C., no intermediate layer is formed at the interface of the electrode layer and the electrolyte layer, whereas when the temperature exceeds a temperature of 1100° C., the solid electrolyte is melt, the structures of the positive active material and the negative active material are changed, and the multilayered product is deformed. Moreover, preferably, the baking temperature ranges from temperatures of 800 to 1050° C. This is because the electrode layer and the electrolyte layer become more compact in the range of temperatures of 800 to 1050° C., which is effective to reduce battery internal resistance.

For the rate of temperature rise and holding time in the baking process, preferably, conditions suited for compacting the electrode layer and the electrolyte layer and forming the intermediate layer are selected and set depending on baking temperatures. In addition, preferably, the rate of temperature rise ranges from 60° C./hr to 600° C./hr, for example, in consideration of a faster rate of temperature rise and a shorter holding time are advantageous to productivity. In addition, preferably, the holding time ranges from 30 minutes to 10 hours.

As a first specific embodiment of a method of manufacture, a method of manufacture of a multilayer all solid state lithium ion rechargeable battery including process steps (1) to (5) described below is provided.

Process step (1): A positive electrode paste containing a metal powder and a positive active material, a negative electrode paste containing a metal powder and a negative active material, and a solid electrolyte paste containing a solid electrolyte powder are prepared.

Process step (2): The solid electrolyte paste is coated and dried on a PET base material to prepare a solid electrolyte sheet. Hereinafter, the green sheet is simply called a sheet. Subsequently, the positive electrode paste is coated and dried on the solid electrolyte sheet to prepare a positive electrode sheet. In addition, the negative electrode paste is coated and dried on a solid electrolyte sheet to prepare a negative electrode sheet.

Process step (3): A positive electrode unit having the positive electrode sheet laminated on the solid electrolyte sheet is removed from the PET base material. In addition, a negative electrode unit having the negative electrode sheet laminated on the solid electrolyte sheet is removed from the PET base material. Subsequently, the positive electrode unit and the negative electrode unit are alternately laminated on each other to prepare a multilayered product in which the positive electrode sheet and the negative electrode sheet are alternately laminated on each other through the solid electrolyte sheet. At this time, the positive electrode unit and the negative electrode unit are aligned and laminated on each other such that the negative electrode sheet is not exposed in one side surface of the multilayered product and the positive electrode sheet is not exposed in the other side surface, as necessary.

Process step (4): The multilayered product is compressed and baked to prepare a sintered multilayered product.

Process step (5): On the side surfaces of the multilayered product, a positive electrode terminal is formed to connect to the positive electrode layer, and a negative electrode terminal is formed to connect to the negative electrode layer. The electrode terminal (lead electrode) can be formed and provided in such a way that a lead electrode paste is coated on the both side surfaces of the battery and then baked at temperatures of 500 to 900° C., for example. A protective layer, not shown in the drawing, is formed on the outermost part of the multilayered product as necessary, and then the battery is completed.

When a battery having a structure in which a current collector layer is laminated on an electrode layer is produced, as a method of manufacture of a second specific embodiment, a method of manufacture of a multilayer all solid state lithium ion rechargeable battery including process steps (1') to (5') described below is provided.

Process step (1'): A positive electrode paste containing a positive active material, a negative electrode paste containing a negative active material, and a solid electrolyte paste containing a solid electrolyte powder are prepared.

Process step (2'): The pastes are coated on a PET base material in order of the solid electrolyte paste, the positive electrode paste, a positive current collector paste, and the positive electrode paste, and dried as the case may be, and the base material is removed to prepare a positive electrode unit. The pastes are coated on a base material in order of the solid electrolyte paste, the negative electrode paste, a negative current collector paste, and the negative electrode paste, and dried as the case may be, and then the base material is removed to prepare a negative electrode unit.

Process step (3'): The positive electrode unit and the negative electrode unit are alternately laminated on each other to prepare a multilayered product in which a positive electrode sheet and a negative electrode sheet are alternately laminated on each other through a solid electrolyte sheet. At this time, the positive electrode unit and the negative electrode unit are aligned and laminated on each other such that the negative electrode sheet is not exposed in one side surface of the multilayered product and the positive electrode sheet is not exposed in the other side surface, as necessary.

Process step (4'): The multilayered product is compressed and baked to prepare a sintered multilayered product.

Process step (5'): On the side surfaces of the multilayered product, a positive electrode terminal is formed to connect to the positive electrode layer, and a negative electrode terminal is formed to connect to the negative electrode layer. The electrode terminal (lead electrode) can be formed and prepared in such a way that a lead electrode paste is coated on the both side surfaces of the battery and then baked at temperatures of 500 to 900° C., for example. A protective layer, not shown in the drawing, is formed on the outermost part of the multilayered product as necessary, and then the battery is completed.

In addition, as a third specific embodiment of a method of manufacture, a method of manufacture of a multilayer all solid state lithium ion rechargeable battery including process steps (i) to (iii) described below is also provided.

Process step (i): A positive electrode paste containing a metal powder and a positive active material, a negative electrode paste containing a metal powder and a negative active material, and a solid electrolyte paste containing a lithium ion conductive inorganic powder are prepared.

Process step (ii): The pastes are coated in order of the positive electrode paste, the solid electrolyte paste, the negative electrode paste, and the solid electrolyte paste, and the pastes are dried to prepare a multilayered product formed of green sheets. At this time, the sheets are aligned and laminated such that the negative electrode sheet is not exposed in one side surface of the multilayered product and the positive electrode sheet is not exposed in the other side surface, as necessary.

Process step (iii): A base material used for preparing the green sheet is removed as necessary, and the multilayered product is compressed and baked to prepare a sintered multilayered product.

Process step (iv): On the side surfaces of the multilayered product, a positive electrode terminal is formed to connect to the positive electrode layer, and a negative electrode terminal is formed to connect to the negative electrode layer. A protective layer is formed on the outermost part of the multilayered product as necessary, and then the battery is completed.

[Mixing Ratio of the Electrode Materials]

(Electric Conductivity and Ampere-Hour Capacity)

The mixing ratio between the active material and the conductive material forming the electrode was changed to produce and evaluate batteries. The detail will be described below.

For the electrode layer forming pastes of the prepared battery, an active material powder was mixed with a conductive material powder at a predetermined volume ratio, and the powders were dispersed in a solvent and a binder to prepare the pastes. For the positive active material to be the material for the electrode layer, $LiMn_2O_4$ was used. For the negative active material, $Li_{4/3}Ti_{5/3}O_4$ was used. For the conductive material to be mixed, AgPd at a weight ratio 85/15 was used. On the other hand, the solid electrolyte layer forming paste was prepared by dispersing $Li_{3.5}Si_{0.5}P_{0.5}O_4$ in a solvent and a binder.

First, the evaluation results of the electric conductivity and ampere-hour capacity of the battery will be described.

Figure 8:
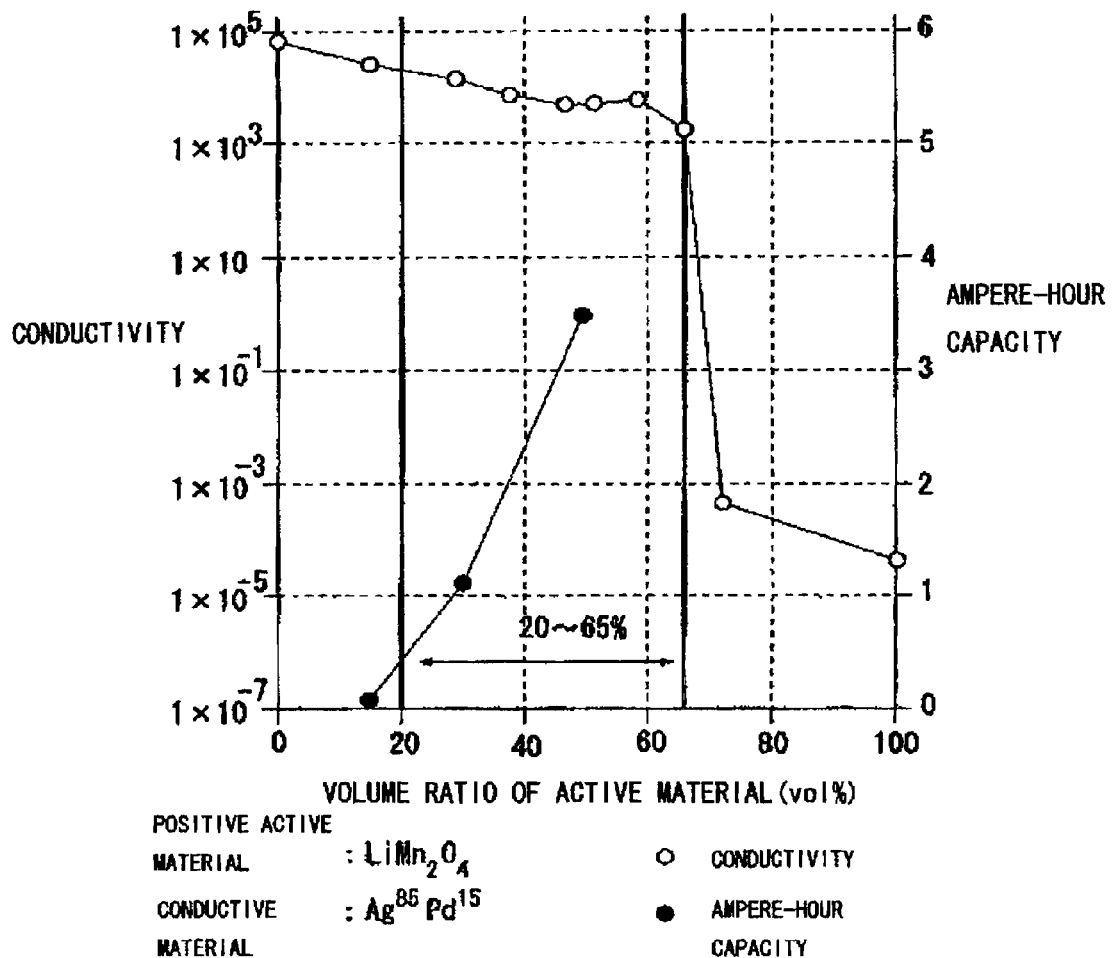
FIG. 8 shows graphs depicting the dependencies of electric conductivity and ampere-hour capacity on the positive active material volume ratio.

FIG. 8 is a graph depicting the dependencies of electric conductivity and ampere-hour capacity on a positive active material volume ratio. Evaluations were made that the volume ratio was a parameter because the volume ratio was considered to contribute to electric conductivity more than a weight ratio did. As the results of varying the mixing ratio between the positive active material and the conductive particles ranging from 0:100 to 100:0, it was found that when the volume ratio of the positive active material was in the range of 20 vol % or greater to 65 vol % or below, the electric conductivity was sufficiently high, the battery impedance was effectively reduced, and the ampere-hour capacity was also sufficiently increased. At the volume ratios of these optimum conditions, the electric conductivity was $1 \times 10^1$ S/cm or greater. When the volume ratio of the active material was below 20 vol %, the electric conductivity became high, but the ampere-hour capacity was decreased because of a small amount of the active material. In addition, it was found that when the volume ratio of the active material exceeded 65 vol %, the electric conductivity was suddenly dropped.

Figure 9:
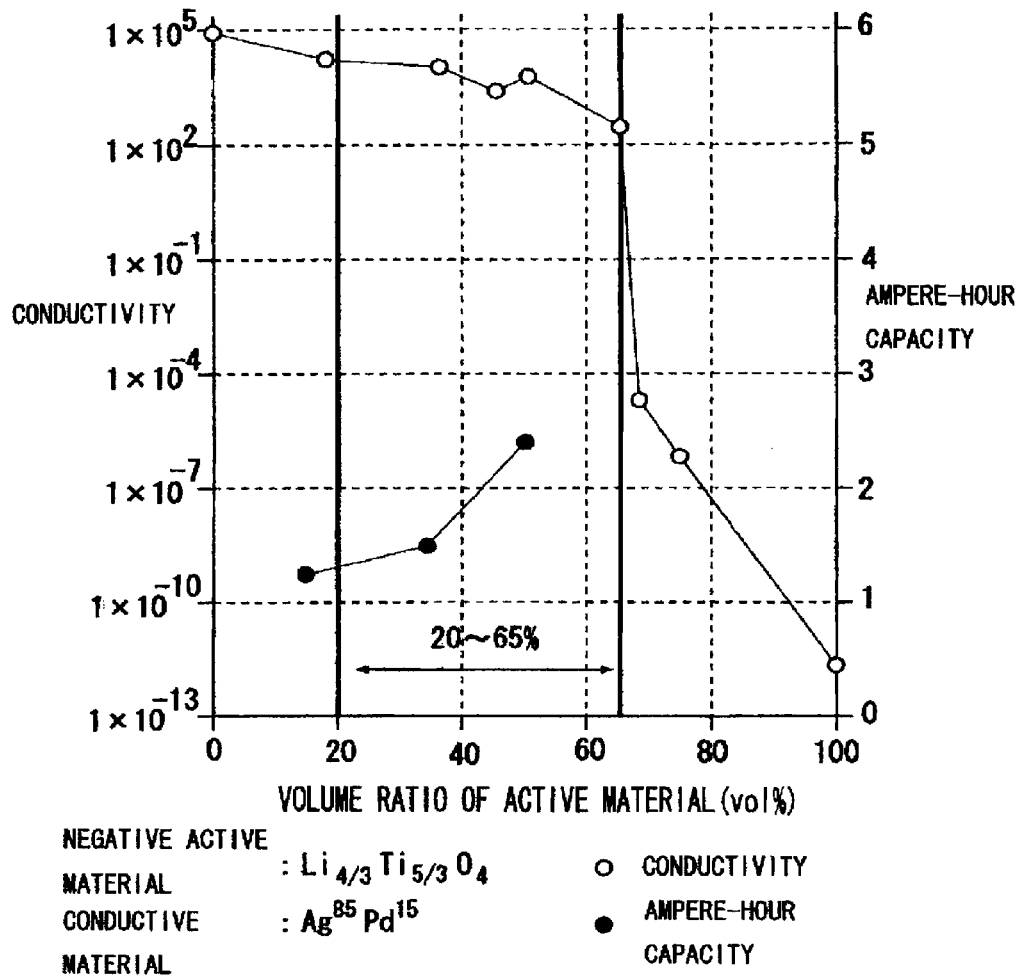
FIG. 9 shows graphs depicting the dependencies of electric conductivity and ampere-hour capacity on the negative active material volume ratio.

FIG. 9 is a graph depicting the dependencies of electric conductivity and ampere-hour capacity on a negative active material volume ratio. As the result of varying the mixing ratio between the negative active material and the conductive particles ranging from 0:100 to 100:0, as similar to the cases of the positive active material, when the volume ratio of the negative active material was in the range of 20 vol % or greater to 65 vol % or below, it was found that the electric conductivity was sufficiently high, the battery impedance was effectively reduced, and the ampere-hour capacity was also sufficiently increased. In the volume ratios of these optimum conditions, the electric conductivity was $1 \times 10^1$ S/cm or greater as well.

[Comparisons to Similar Prior Art Techniques]

Patent Document 2 discloses a technique "a solid electrolyte battery having a solid electrolyte between a pair of electrodes, in which an intermediate layer having a reaction interface of the solid electrolyte with an electrode active material is provided between the electrode and the solid electrolyte". An object of this technique is to reduce battery internal resistance.

In the technique disclosed in Patent Document 2, a paste formed of a material that the active material and the solid electrolyte are mixed, baked and synthesized is coated and dried on an electrode layer to form the intermediate layer. Moreover, a solid electrolyte layer is coated, dried, and formed on the intermediate layer to prepare the battery. No baking is conducted after the electrode layer and the electrolyte layer are laminated. This method is different from the method according to the present invention in which pastes for forming the positive electrode layer, the electrolyte layer, and the negative electrode layer are coated and dried to form green sheets, and the green sheets are laminated and then baked.

Moreover, Patent Document 2 has no descriptions that a complex oxide formed of a IV group element and lithium is preferable for an electrolyte material. Therefore, it cannot be said that a useful reaction product is not always formed on the intermediate layer. In addition, even though interface resistance between the active material and the electrolyte is reduced inside the intermediate layer, it cannot be said that because the product is not baked after laminated, the interface resistance or adhesion between the intermediate layer and the electrode layer or the intermediate layer and the electrolyte layer is not improved, and the overall electric characteristics and mechanical characteristics of the battery are not improved. In addition, because of the necessities of conducting process steps of coating and drying the intermediate layer, problems arise that process steps are complicated and manufacture costs are expensive.

Therefore, the patentability of the present invention is not rejected over the technique disclosed in Patent Document 2.

Patent Document 3 discloses a technique "a battery using a solid electrolyte, in which at an interface of at least one of electrodes and an electrolyte, an area is formed, in which one element of the electrode and one element of the electrolyte form a compound". An objet of this technique is to reduce internal resistance and to suppress the occurrence of delamination at the interface.

The technique disclosed in Patent Document 3 describes a method having a scheme of forming the area layer in which a film is deposited and then allowed to stand in a moisture containing Ar atmosphere, for example. Although it is also described that it is possible to form the area layer by heat treatment, there are no detailed descriptions of the method.

It is described that the area layer is an oxide, nitride, or hydroxide, the thickness of the area layer ranges from 0.01 to 300 nm, and charging and discharging are inhibited when the thickness is greater than 300 nm. Therefore, it is estimated that the substance forming the area layer does not function as the active material or the electrolyte. Moreover, no description is made that a complex oxide formed of a IV group element and lithium is preferable for the electrolyte material.

Therefore, the patentability of the present invention is not rejected over the technique disclosed in Patent Document 3.

Patent Document 4 discloses a technique in which "an electrolyte material uses an electrolyte material having a γ"-lithium phosphate crystal structure and a positive electrode and an electrolyte are laminated and then collectively baked". An object of this technique is to reduce contact resistance at the interface.

In the technique disclosed in Patent Document 4, electrolyte pellets formed by pressurizing and molding powder are sintered, and the pellets and an active material are put in a mold, pressurized, molded, and then collectively baked to form a battery. This method is different from the present invention in which the positive electrode layer, the electrolyte layer, and the negative electrode layer are laminated in the state of green sheets before baked, and then baked to form the intermediate layer formed of a useful reaction product. Moreover, an object of the technique disclosed in Patent Document 4 is to reduce contact resistance between active material and electrolyte particles, not for reducing resistance by forming a novel useful reaction product like the present invention.

Therefore, the patentability of the present invention is not rejected over the technique disclosed in Patent Document 4.

Patent Document 5 discloses an all solid secondary battery using $Li_2O—B_2O_3—SiO_2—ZnO$ as an option for a solid electrolyte material. In the technique disclosed in Patent Document 5, a product having an electrode layer laminated on an electrolyte layer is microwave heated and baked. The product is baked for a short time, whereby the filling factors of the electrode and the solid electrolyte are increased to improve ionic conductance, while reactions between individual particles in the electrode and the solid electrolyte are suppressed. In other words, it is not a technique to form a reaction layer. The technique is different from the technique according to the present invention in which materials for the electrodes and the electrolyte are selected to constructively form a useful intermediate layer by baking, whereby bonding strength is improved and interface resistance is reduced.

Therefore, the patentability of the present invention is not rejected over the technique disclosed in Patent Document 5.

Patent Document 6 discloses a lithium secondary battery using $Li_4SiO_4$ as an option for a solid electrolyte material. In the technique disclosed in Patent Document 6, a battery is produced in which an inorganic solid electrolyte film is formed on a lithium metal foil to be a negative electrode by sputtering, and a positive electrode formed by coating a mixture of a positive active material and carbon on an aluminum foil is bonded on the electrolyte film. The electrode layer and the electrolyte layer are not baked after laminated. In other words, it is not the technique to form a useful intermediate layer by baking.

Therefore, the patentability of the present invention is not rejected over the technique disclosed in Patent Document 6.

[Specific Embodiments of the Battery Structure]

FIGS. 7(a) to 7(e) are cross sections depicting lithium ion rechargeable batteries according to specific embodiments of the present invention, and graphs depicting concentration distributions.

Figure 7:
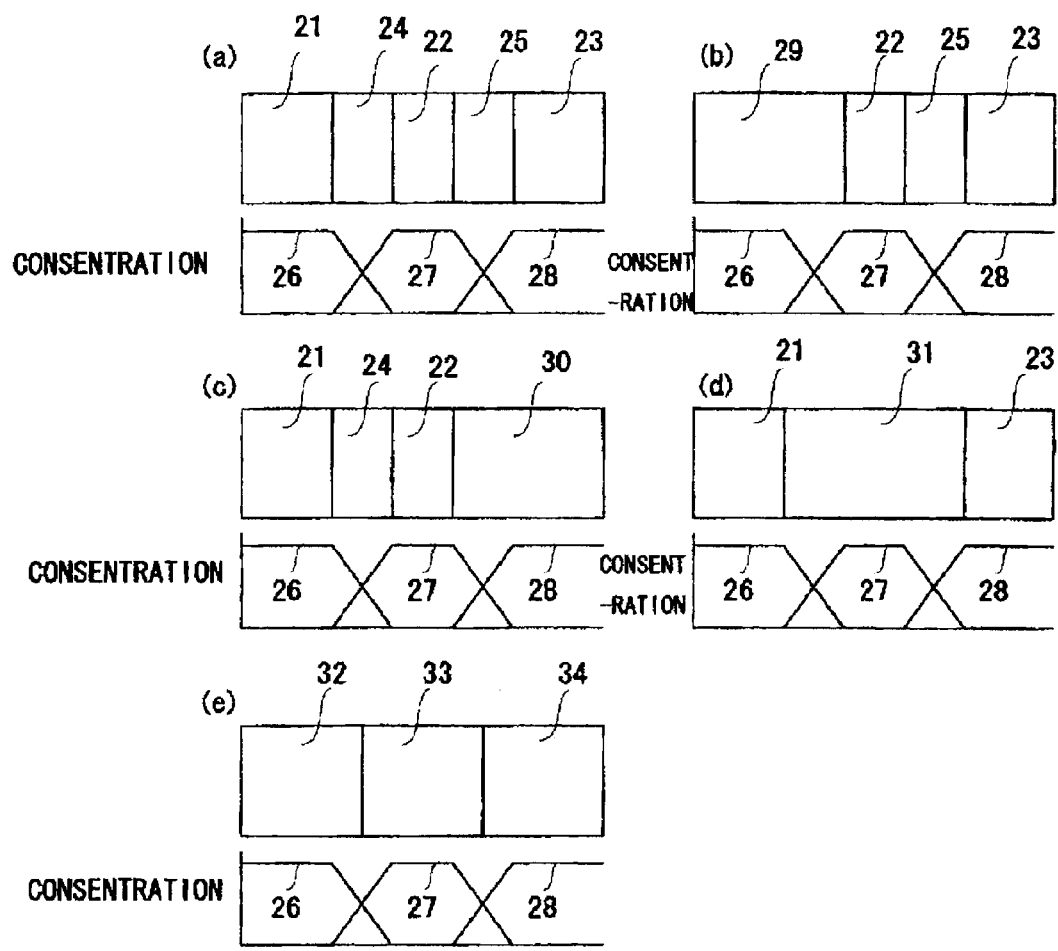
FIGS. 7(a) to 7(e) are cross sections depicting the lithium ion rechargeable battery according to a specific embodiment of the present invention and graphs depicting concentration distributions.

In FIG. 7(a), in an intermediate layer 24 formed at the interface of a positive electrode layer 21 and an electrolyte layer 22, the positive active material and the electrolyte exist in concentration distributions with slopes. Similarly, in an intermediate layer 25 formed at the interface of a negative electrode layer 23 and the electrolyte layer 22, the negative active material and the electrolyte exist in concentration distributions with slopes.

It may be possible that the film thickness before baked and the baking conditions are controlled to allow the positive electrode layer, the electrolyte layer, and/or the negative electrode layer to partially react as well as allow the layers to entirely react after baked, and then a reaction product layer is formed. Also in this case, these layers are formed such that the concentration distributions of the positive active material, the electrolyte, and the negative active material become in turn dominant, whereby an excellent battery of high bonding strength and small internal resistance can be produced.

FIG. 7(b) is a cross section depicting the case in which a positive electrode layer was all turned into a reaction product layer by baking. In a reaction product layer 29, the positive active material is dominant in the composition after baked.

FIG. 7(c) is a cross section depicting the case in which a negative electrode layer was all turned into a reaction product layer by baking. In a reaction product layer 30, the negative active material is dominant in the composition after baked.

FIG. 7(d) is a cross section depicting the case in which an electrolyte layer was all turned into a reaction product layer by baking. In a reaction product layer 31, the electrolyte is dominant in the composition after baked.

FIG. 7(e) is a cross section depicting the case in which a positive electrode layer, an electrolyte layer, and a negative electrode layer were all turned into reaction product layers by baking. In a reaction product layer 32, the positive active material is dominant in the composition after baked, in a reaction product layer 33, the electrolyte is dominant in the composition after baked, and in a reaction product layer 34, the negative active material is dominant in the composition after baked.

As described above, a specific embodiment of the lithium ion rechargeable battery according to the present invention is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the positive electrode layer is formed of a sintered compact produced from a reaction between a starting material for the positive active material and a starting material for the solid electrolyte.

In addition, another specific embodiment of the lithium ion rechargeable battery according to the present invention is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the negative electrode layer is formed of a sintered compact produced from a reaction between a starting material for the negative active material and a starting material for the solid electrolyte.

Moreover, still another specific embodiment of the lithium ion rechargeable battery according to the present invention is a multilayer all solid state lithium ion rechargeable battery characterized by including: a multilayered product having a positive electrode layer containing a positive active material laminated on a negative electrode layer containing a negative active material through an electrolyte layer containing a solid electrolyte, wherein a part or all of the electrolyte layer is formed of a sintered compact produced by a reaction between a starting material for the electrolyte substance and a starting material for the negative active material and/or a starting material for the positive active material.

As defined above, the term "sintered compact" means a dense product (solid) formed by baking (sintering) a solid powder aggregate at a temperature lower than the melting point. The states before and after sintered can be distinguished by observing a cross section of a solid. In the cross sectional structure before sintered, solid powder particles are gathered as separated in almost uniform forms, whereas after sintered, (1) a neck (joining part) is formed between particles, (2) the neck between particles grows, (3) a reduction in voids (pores) caused by grain growth (growth of particles and a reduction in the number of particles) and compacting are observed, and individual particles take various forms depending on the degree of sintering. The size of particles and the presence of voids are observed to determine the presence of sintering and the degree of progress of sintering.

In addition, the ratio of the sintered compact can be controlled by controlling baking conditions (the baking temperature, rate of temperature rise, holding time, and baking atmosphere). Particularly, control of the baking temperature is effective.

The ratio of the sintered compact can be evaluated from the equation:

(density of sintered compact)/(true density, which is inherent density of sintered compact material)× 100

Alternatively, the voidage is evaluated from the observation of cross sections, whereby the ratio of the sintered compact can be evaluated. For the voidage, preferably, in the solid electrolyte, ions more tend to pass as the number of voids is small, and in the active material, energy density becomes higher as the number of voids is small. More specifically, preferably, in the solid electrolyte, the voidage ranges from 0% or greater to 10% or below. Preferably, in the active material, the voidage ranges from 0% or greater to 10% or below. For example, the baking temperature is set to a temperature of 1000° C., whereby a sintered compact of high density with few voids can be obtained.

EXAMPLES

Example 1

Hereinafter, examples are used to describe the present invention in detail. In addition, the expression "parts" means parts by weight, unless otherwise specified.

(Preparation of a Positive Electrode Paste)

For the positive active material, $LiMn_2O_4$ prepared by a method described below was used.

$Li_2CO_3$ and $MnCO_3$ were used as starting materials, and weighted to be at a mol ratio 1:4, water was used as a solvent to conduct wet blending in a ball mill for 16 hours, and then the mixture was dewatered and dried. The resulting powder was calcined in the air for two hours at a temperature of 800° C. The calcined product was roughly crushed, water was used as a solvent to conduct wet blending in a ball mill for 16 hours, and then the mixture was dewatered and dried to obtain a positive active material powder. The BET value of this powder was 13.4 $m^2/g$. An X-ray diffraction device was used to confirm that the composition of the prepared powder was $LiMn_2O_4$.

For a positive electrode paste, 100 parts of a mixture that Ag/Pd powder at a weight ratio 85/15 used as metal powders in advance was mixed with $LiMn_2O_4$ used as the positive active material powder at a volume ratio 60:40, 15 parts of ethylcellulose as a binder, and 65 parts of dihydroterpinenol as a solvent were added, mixed, and dispersed by a triple roll mill, and then a positive electrode paste was prepared. Here, for Ag/Pd powder at a weight ratio 85/15, a mixture of Ag powder (average particle size is 0.3 μm) and Pd powder (average particle size is 1.0 μm) was used.

(Preparation of a Negative Electrode Paste)

For a negative active material, $Li_{4/3}Ti_{5/3}O_4$ prepared by a method described below was used.

$Li_2CO_3$ and $TiO_2$ were used as starting materials, and weighted to be at a mol ratio 2:5, water was used as a solvent to conduct wet blending in a ball mill for 16 hours, and then the mixture was dewatered and dried. The resulting powder was calcined in the air for two hours at a temperature of 800° C. The calcined product was roughly crushed, water was used as a solvent to conduct wet blending in a ball mill for 16 hours, and then the mixture was dewatered and dried to obtain a negative active material powder. The BET value of this powder was 6.3 $m^2/g$. An X-ray diffraction device was used to confirm that the composition of the prepared powder was $Li_{4/3}Ti_{5/3}O_4$.

For a negative electrode paste, 100 parts of a mixture that Ag/Pd powder at a weight ratio 85/15 used as metal powders in advance was mixed with $Li_{4/3}Ti_{5/3}O_4$ used as a negative active material powder at a volume ratio 60:40, 15 parts of ethylcellulose as a binder, and 65 parts of dihydroterpinenol as a solvent were added, mixed, and dispersed by a triple roll mill, and then a negative electrode paste was prepared. Here, for Ag/Pd powder at a weight ratio 85/15, a mixture of Ag powder (average particle size is 0.3 μm) and Pd powder (average particle size is 1.0 μm) was used.

(Preparation of a Solid Electrolyte Sheet)

For a solid electrolyte, $Li_{3.5}Si_{0.5}P_{0.5}O_4$ prepared by a method described below was used.

$Li_2CO_3$, $SiO_2$ and $Li_3PO_4$ were used as starting materials, and weighted to be at a mol ratio 2:1:1, water was used as a solvent to conduct wet blending in a ball mill for 16 hours, and then the mixture was dewatered and dried. The resulting powder was calcined in the air for two hours at a temperature of 950° C. The calcined product was roughly crushed, water was used as a solvent to conduct wet blending in a ball mill for 16 hours, and then the mixture was dewatered and dried to obtain a lithium ion conductive inorganic powder. The BET value of this powder was 14.0 $m^2/g$. An X-ray diffraction device was used to confirm that the composition of the prepared powder was $Li_{3.5}Si_{0.5}P_{0.5}O_4$.

Subsequently, 100 parts of ethanol and 200 parts of toluene were added to 100 parts of this powder in a ball mill for wet blending. After that, 16 parts of a polyvinyl butyral binder and 4.8 parts of benzylbutylphthalate are further added, and mixed to prepare a lithium ion conductive inorganic paste. This lithium ion conductive inorganic paste was shaped into a sheet by doctor blading as a PET film was used for a base material, and then a lithium ion conductive inorganic sheet having a thickness of 13 μm was obtained.

(Preparation of a Lead Electrode Paste)

100 parts of Ag powder was mixed with 5 parts of a glass frit, 10 parts of ethylcellulose as a binder and 60 parts of dihydroterpinenol as a solvent were added, mixed, and dispersed by a triple roll mill, and then a lead electrode paste was prepared.

(Preparation of a Positive Electrode Unit)

On the opposite surface of the PET film of the above-described lithium ion conductive inorganic sheet having a thickness of 13 μm, the positive electrode paste was printed by screen printing in a thickness of 8 μm. Subsequently, the printed positive electrode paste was dried for 5 to 10 minutes at temperatures of 80 to 100° C. As described above, a sheet of a positive electrode unit having the positive electrode paste printed on the lithium ion conductive inorganic sheet was obtained.

(Preparation of a Negative Electrode Unit)

On the opposite side of the PET film of the above-described lithium ion conductive inorganic sheet having a thickness of 13 μm, the negative electrode paste was printed by printing in a thickness of 8 μm. As described above, a sheet of a negative electrode unit having the negative electrode paste printed on the lithium ion conductive inorganic sheet was obtained.

(Preparation of a Multilayered Product)

The PET film was removed from each of the positive electrode unit and the negative electrode unit, and then these two units were alternately laminated through the lithium ion conductive inorganic substance. At this time, the positive electrode unit was displaced from the negative electrode unit, and laminated such that the positive current collector was extended only on one end surface and the negative current collector was extended only on the other end surface. After that, this product was shaped at a temperature of 80° C. at pressure of 1000 $kgf/cm^2$, and then cut to prepare a multilayered block. After that, the multilayered block was baked to obtain a multilayered product. For baking, the temperature was increased in the air to a temperature of 1000° C. at the rate of temperature rise of 200° C./hour, the temperature was kept at the temperature for two hours, and the product was naturally cooled after baked. In the multilayered product after sintered thus obtained, the thickness of the lithium ion conductive inorganic substance was 7 μm, the thickness of a unit of the positive electrode was 5 μm, and the thickness of a unit of the negative electrode was 6 μm. In addition, the length, width, and height of the multilayered product were 8 mm×8 mm×0.1 mm, respectively.

(Formation of a Lead Electrode)

The lead electrode paste was coated on the end surfaces of the multilayered product and baked at a temperature of 800° C. to form a pair of lead electrodes, and then an all solid lithium ion rechargeable battery was obtained.

Example 2

XRD analysis was used to study reactions between the solid electrolyte, the positive active material, and the negative active material by baking and to identify the reaction product.

Figure 3:
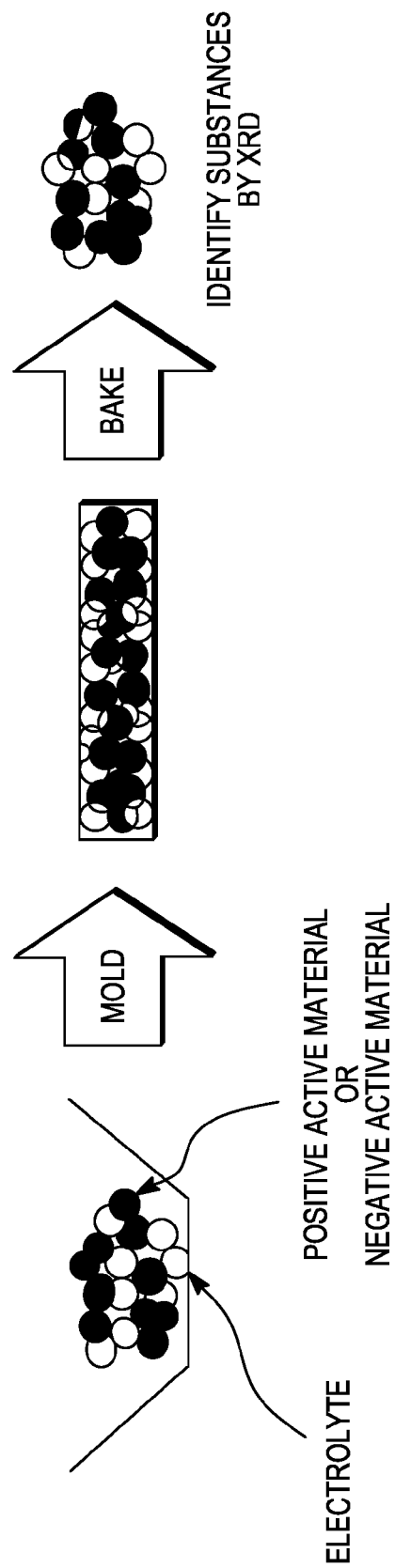
FIG. 3 is a work flowchart depicting a study experiment to study reactions between an electrolyte material and an active material.

FIG. 3 is a work flowchart depicting a study experiment to study reactions between the solid electrolyte material and the active material.

A study method was conducted according to the process steps shown below.
(1) The solid electrolyte, the positive active material, and the negative active material were mixed in a mortar.
(2) The mixed powders were shaped in a mold to prepare a disk.
(3) The temperature of the prepared disk was increased to a set temperature at the rate of temperature rise of 200° C./hr, kept for two hours, and then allowed to stand to cool. The set temperature was temperatures of 500, 600, 700, 800, 900, 960, 1000, and 1050° C.
(4) The baked disk was crushed in a mortar to form a sample.
(5) Substances were identified by XRD.

Figure 4:
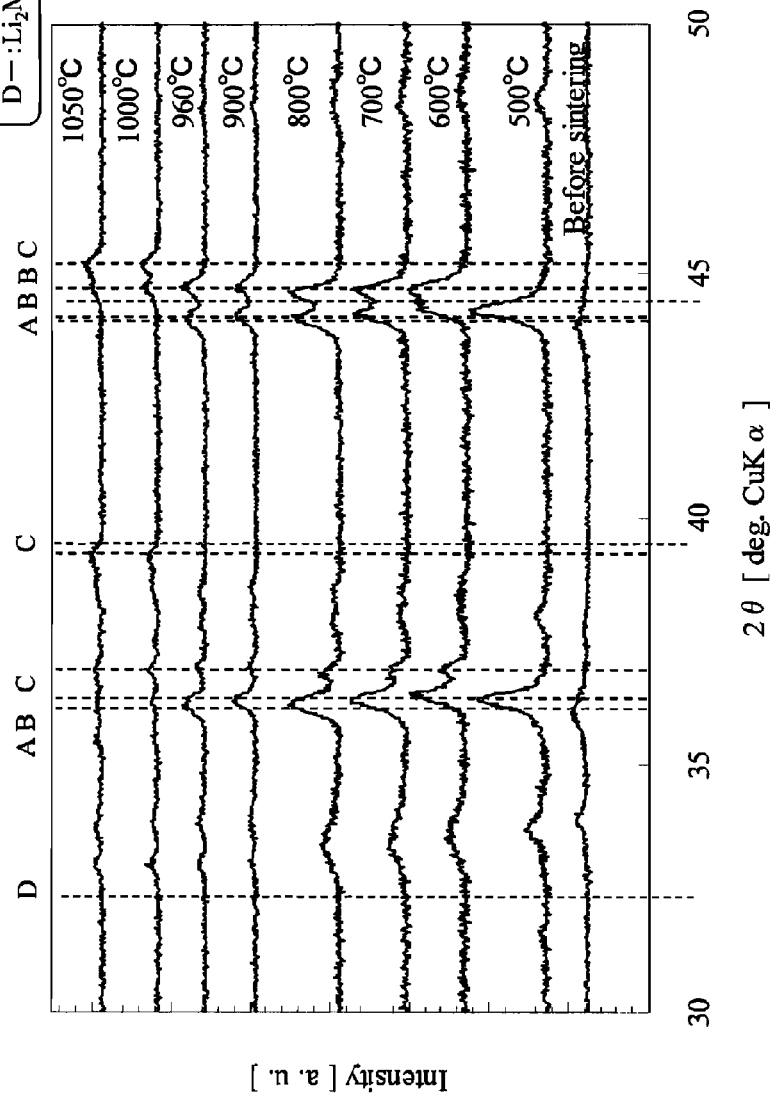
FIG. 4 shows XRD patterns of samples prepared in which a solid electrolyte was mixed with a positive active material and then baked.

FIG. 4 shows XRD patterns of samples that the solid electrolyte and the positive active material were mixed and then baked. It is seen that in the pattern before baked and the pattern of baking at a temperature of 500° C., only the peak of $LiMn_2O_4$ used as the positive active material is observed, whereas in the patterns of baking at temperatures of 600° C. or greater, the peaks of $LiMnO_2$, $Li_2MnO_3$, and $Li_{1.4}Mn_{1.7}O_4$, which are reaction products, are observed.

Figure 5:
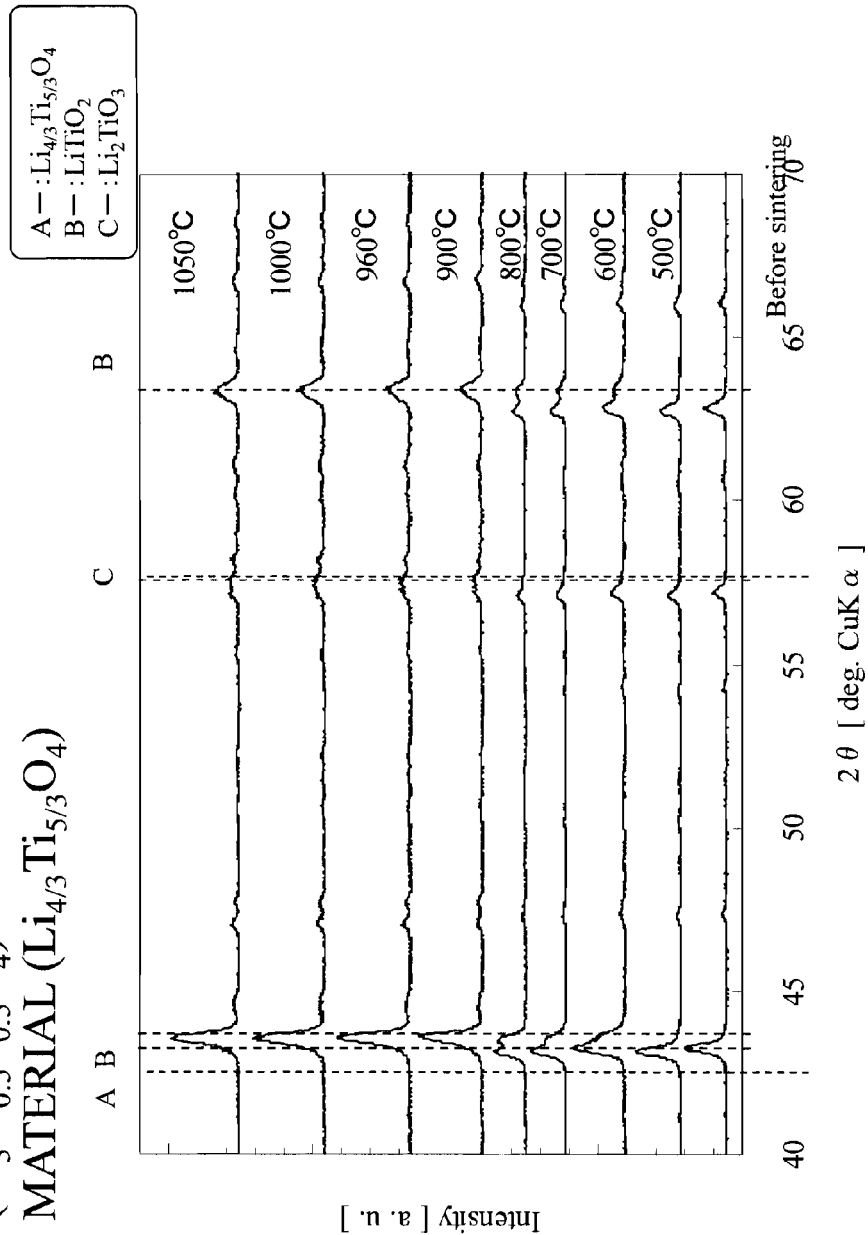
FIG. 5 shows XRD patterns of samples prepared in which a solid electrolyte was mixed with a negative active material and then baked.

FIG. 5 shows XRD patterns of samples that the solid electrolyte and the negative active material were mixed and then baked. It is seen that in the pattern before baked and the pattern of baking at a temperature of 500° C., only the peak of $Li_{4/3}Ti_{5/3}O_4$ used as the negative active material is observed, whereas in the patterns of baking at temperatures of 600° C. or greater, the peaks of $LiTiO_2$, and $Li_2TiO_3$, which are reaction products, are observed.

Example 3

XRD analysis was conducted by a method similar to that of Example 2, reactions between the solid electrolyte and the active material by baking were studied, and reaction products were identified.

Figure 10:
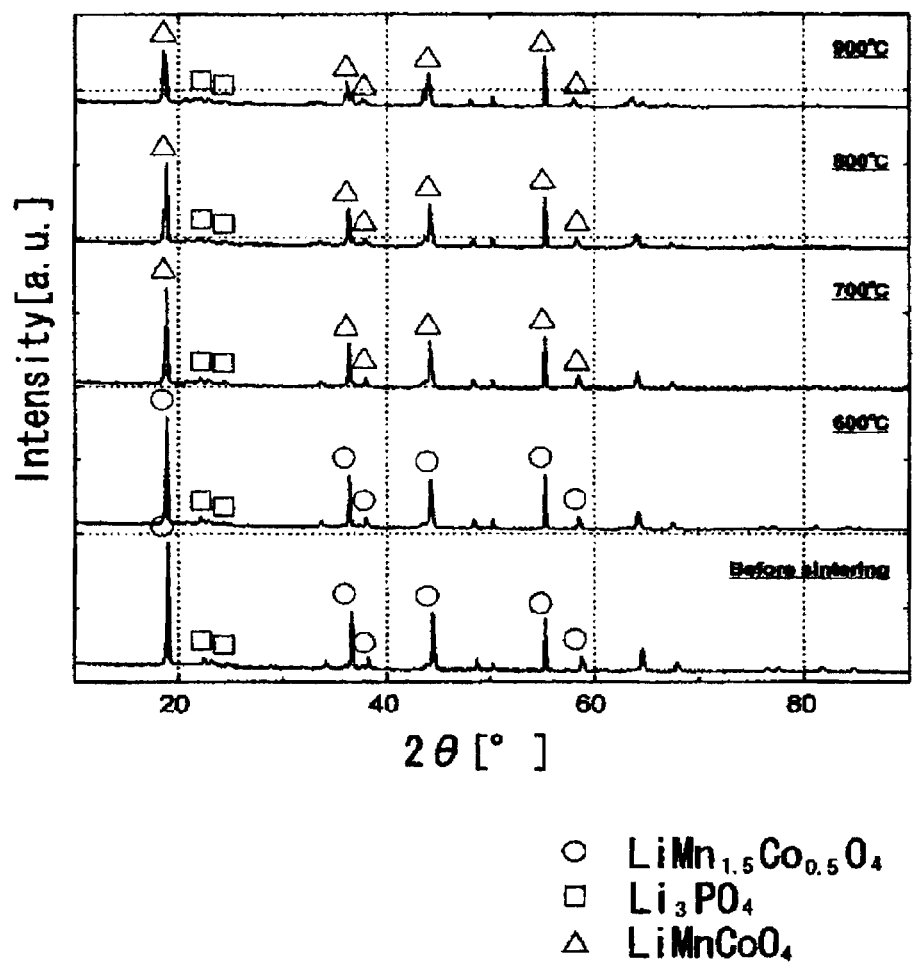
FIG. 10 shows XRD patterns of samples prepared in which a solid electrolyte was mixed with an active material and then baked.

FIG. 10 shows XRD patterns of samples that a solid electrolyte $Li_{3.5}Si_{0.5}P_{0.5}O_4$ and an active material $LiMn_{1.5}Co_{0.5}O_4$ were mixed and then baked. It is seen that in the pattern before baked and the pattern of baking at a temperature of 600° C., only the peaks of the solid electrolyte $Li_{3.5}Si_{0.5}P_{0.5}O_4$ and the active material $LiMn_{1.5}CO_{0.5}O_4$ are observed, whereas in the patterns of baking at temperatures of 700° C. or greater, the peak of $LiMnCoO_4$, which is a reaction product, is observed. $LiMnCoO_4$ is a substance that functions as the active material.

Figure 11:
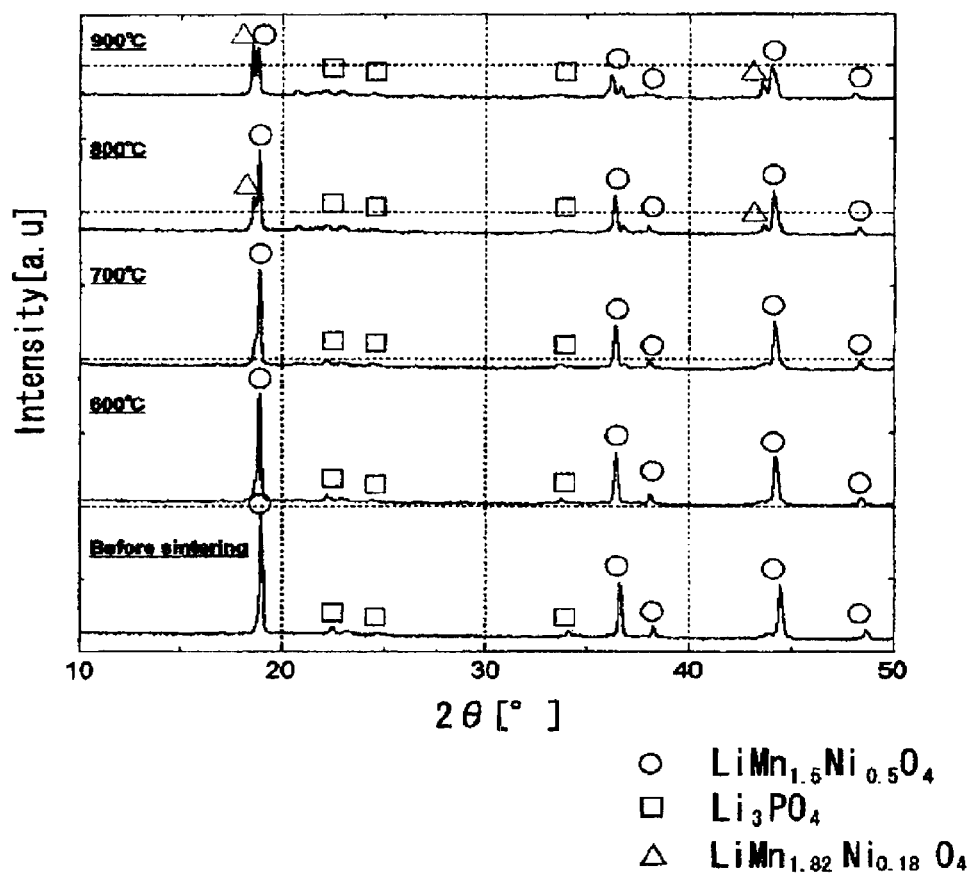
FIG. 11 shows XRD patterns of samples prepared in which a solid electrolyte was mixed with an active material and then baked.
Figure 12:
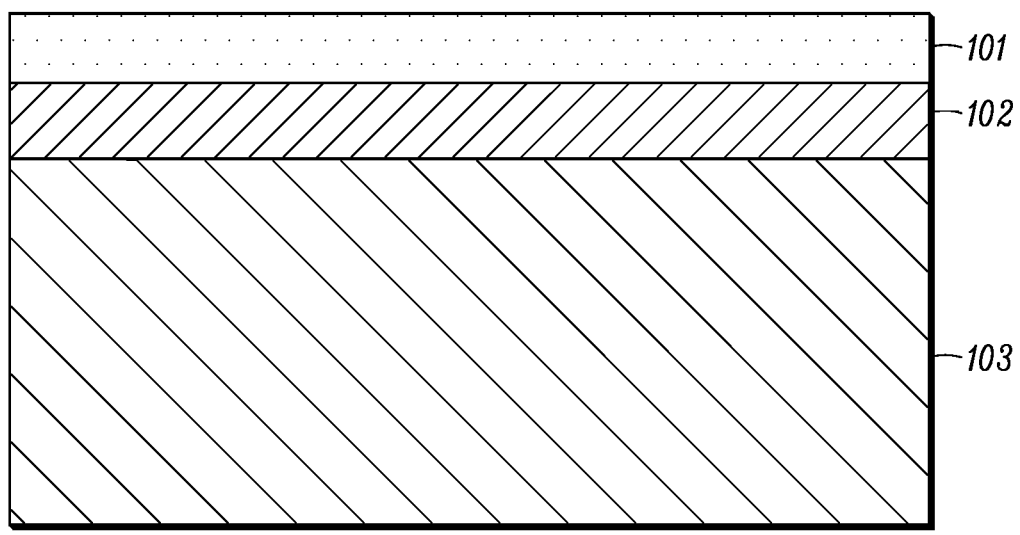
FIG. 12 is a cross section depicting a lithium ion rechargeable battery before.

FIG. 11 shows XRD patterns of samples that a solid electrolyte $Li_{3.5}Si_{0.5}P_{0.5}O_4$ and an active material $LiMn_{1.5}Ni_{0.5}O_4$ were mixed and then baked. It is seen that in the pattern before baked and the patterns of baking at temperatures of 600° C. and 700° C., only the peaks of the solid electrolyte $Li_{3.5}Si_{0.5}P_{0.5}O_4$ and the active material $LiMn_{1.5}Ni_{0.5}O_4$ are observed, whereas in the patterns of baking at temperatures of 800° C. or greater, the peak of $LiMn_{1.82}Ni_{0.18}O_4$, which is a reaction product, is observed. $LiMn_{1.82}Ni_{0.18}O_4$ is a substance that functions as the active material.

INDUSTRIAL APPLICABILITY

As discussed above, the lithium ion rechargeable battery according to the present invention and the method of manufacture of the same are advantageous in a reduction in the internal resistance of the lithium ion rechargeable battery and improvement of the charging and discharging cycle characteristics. A small-sized battery of high performance and large capacity is provided to make significant contributions in the field of electronics in particular.

The invention claimed is:

1. A method of manufacture of a lithium ion rechargeable battery, comprising:
    alternately laminating a positive electrode layer green sheet and a negative electrode layer green sheet through at least an electrolyte layer green sheet to form a multilayered product, wherein the positive electrode layer green sheet and/or the negative electrode layer green sheet is formed by mixing an active material with a conductive material, and wherein a mixing ratio of the active material with the conductive material is within a range of 20:80 to 65:35 in a volume ratio; and
    collectively baking the multilayered product to form a sintered multilayered product,
    wherein a starting material for the electrolyte layer contains at least a complex oxide of lithium and an element selected from the group consisting of Si and Ge.

2. A method of manufacture of a lithium ion rechargeable battery, comprising:
    dispersing at least a solid electrolyte material in a binder and a solvent to form a solid electrolyte layer paste;
    coating and drying the solid electrolyte layer paste to form a solid electrolyte layer green sheet;
    mixing an active material with a conductive material, and dispersing the materials in a binder and a solvent to form a positive electrode layer paste and/or a negative electrode layer paste;
    coating and drying the positive electrode layer paste and/or the negative electrode layer paste to form a positive electrode layer green sheet and/or a negative electrode layer green sheet;
    alternately laminating the positive electrode layer green sheet and the negative electrode layer green sheet through the solid electrolyte layer green sheet to form a multilayered product; and
    collectively baking the multilayered product to form a sintered multilayered product,
    wherein a starting material for the electrolyte layer contains at least a complex oxide of lithium and an element selected from the group consisting of Si and Ge, and
    wherein a mixing ratio of mixing the active material with the conductive material is within a range of 20:80 to 65:35 in a volume ratio.

3. The method of manufacture of a lithium ion rechargeable battery according to claim 1, characterized in that a baking temperature in the baking step ranges from temperatures of 600° C. or greater to 1100° C. or below.

4. The method of manufacture of a lithium ion rechargeable battery according to claim 1, characterized in that a baking temperature in the baking step ranges from temperatures of 800° C. or greater to 1050° C. or below.

5. The method of manufacture of a lithium ion rechargeable battery according to claim 1, characterized in that the sintered multilayered product formed in the baking step has a positive electrode layer containing a positive active material laminated on a negative electrode layer containing a negative active material through an electrolyte layer containing a solid electrolyte, wherein a part or all of the positive electrode layer, a part or all of the negative electrode layer, and/or a part or all of the electrolyte layer contains a substance that functions as an active material or an electrolyte formed from a reaction between the positive active material and/or the negative active material and the solid electrolyte.

6. The method of manufacture of a lithium ion rechargeable battery according to claim 2, characterized in that the sintered multilayered product formed in the baking step has a positive electrode layer containing a positive active material laminated on a negative electrode layer containing a negative active material through an electrolyte layer containing a solid electrolyte, wherein a part or all of the positive electrode layer, a part or all of the negative electrode layer, and/or a part or all of the electrolyte layer contains a substance that functions as an active material or an electrolyte formed from a reaction between the positive active material and/or the negative active material and the solid electrolyte.

7. The method of claim 1, wherein the starting material includes at least one selected from the group consisting of lithium silicophosphate ($Li_{3.5}Si_{0.5}P_{0.5}O_4$), phosphoric acid germanium lithium ($Li_{3.5}Ge_{0.5}P_{0.5}O_4$), $Li_2O$—$SiO_2$, $Li_2O$—$V_2O_5$—$SiO_2$, and $Li_2O$—$GeO_2$.

8. The method of claim 2, wherein the starting material includes at least one selected from the group consisting of lithium silicophosphate ($Li_{3.5}Si_{0.5}P_{0.5}O_4$), phosphoric acid germanium lithium ($Li_{3.5}Ge_{0.5}P_{0.5}O_4$), $Li_2O$—$SiO_2$, $Li_2O$—$V_2O_5$—$SiO_2$, and $Li_2O$—$GeO_2$.

9. The method of claim 1, wherein the multilayered product is collectively baked so that the sintered multilayered product that is formed has a voidage of 0% or greater to 10% or below.

10. The method of claim 2, wherein the multilayered product is collectively baked so that the sintered multilayered product that is formed has a voidage of 0% or greater to 10% or below.

* * * * *